United States Patent
Drzal et al.

(10) Patent No.: US 7,208,221 B2
(45) Date of Patent: Apr. 24, 2007

(54) BIOCOMPOSITES SHEET MOLDING AND METHODS OF MAKING THOSE

(75) Inventors: Lawrence T. Drzal, Okemos, MI (US); Geeta Mehta, Ann Arbor, MI (US); Manjusri Misra, Lansing, MI (US); Amar K. Mohanty, Lansing, MI (US); Kelby Thayer, Leslie, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 99 days.

(21) Appl. No.: 10/966,988

(22) Filed: Oct. 15, 2004

(65) Prior Publication Data

US 2006/0046042 A1    Mar. 2, 2006

Related U.S. Application Data

(60) Provisional application No. 60/511,219, filed on Oct. 15, 2003.

(51) Int. Cl.
 B32B 13/02 (2006.01)
 B32B 27/04 (2006.01)
 B32B 27/12 (2006.01)

(52) U.S. Cl. .............................. 428/297.4; 428/300.7; 442/395

(58) Field of Classification Search .................. 522/71, 522/74, 74, 120; 523/115; 428/297.4, 300.7; 442/395
See application file for complete search history.

(56) References Cited

U.S. PATENT DOCUMENTS

| | | | |
|---|---|---|---|
| 3,615,979 A | 10/1971 | Davis, Sr. et al. | |
| 3,713,927 A | 1/1973 | Peterson et al. | |
| 3,835,212 A | 9/1974 | Piacente | |
| 3,931,095 A | 1/1976 | Kondo et al. | |
| 4,072,273 A * | 2/1978 | Reiniger | 241/19 |
| 6,194,117 B1 * | 2/2001 | Smith et al. | 430/137.17 |
| 6,433,037 B1 * | 8/2002 | Guzauskas | 522/71 |
| 2003/0088007 A1 | 5/2003 | Wood et al. | |

FOREIGN PATENT DOCUMENTS

| | | |
|---|---|---|
| DE | 2357000 | 5/1974 |
| JP | 49107086 | 10/1974 |
| JP | 50005463 | 1/1975 |
| JP | 50008882 | 1/1975 |
| JP | 50014792 | 2/1975 |
| JP | 50036588 | 4/1975 |

* cited by examiner

Primary Examiner—N. Edwards
(74) Attorney, Agent, or Firm—Ian C. McLeod; Steven E. Merritt

(57) ABSTRACT

A Sheet Molding Compound (SMC) as prepregs and cured compositions with naturally derived fibers which have been dried for at least three hours is described. The SMC process combines polyester polymer or resin with the fibers preferably continuously. The molded products are useful for a variety a purposes where glass fiber filled polyester polymers are conventionally used.

33 Claims, 18 Drawing Sheets

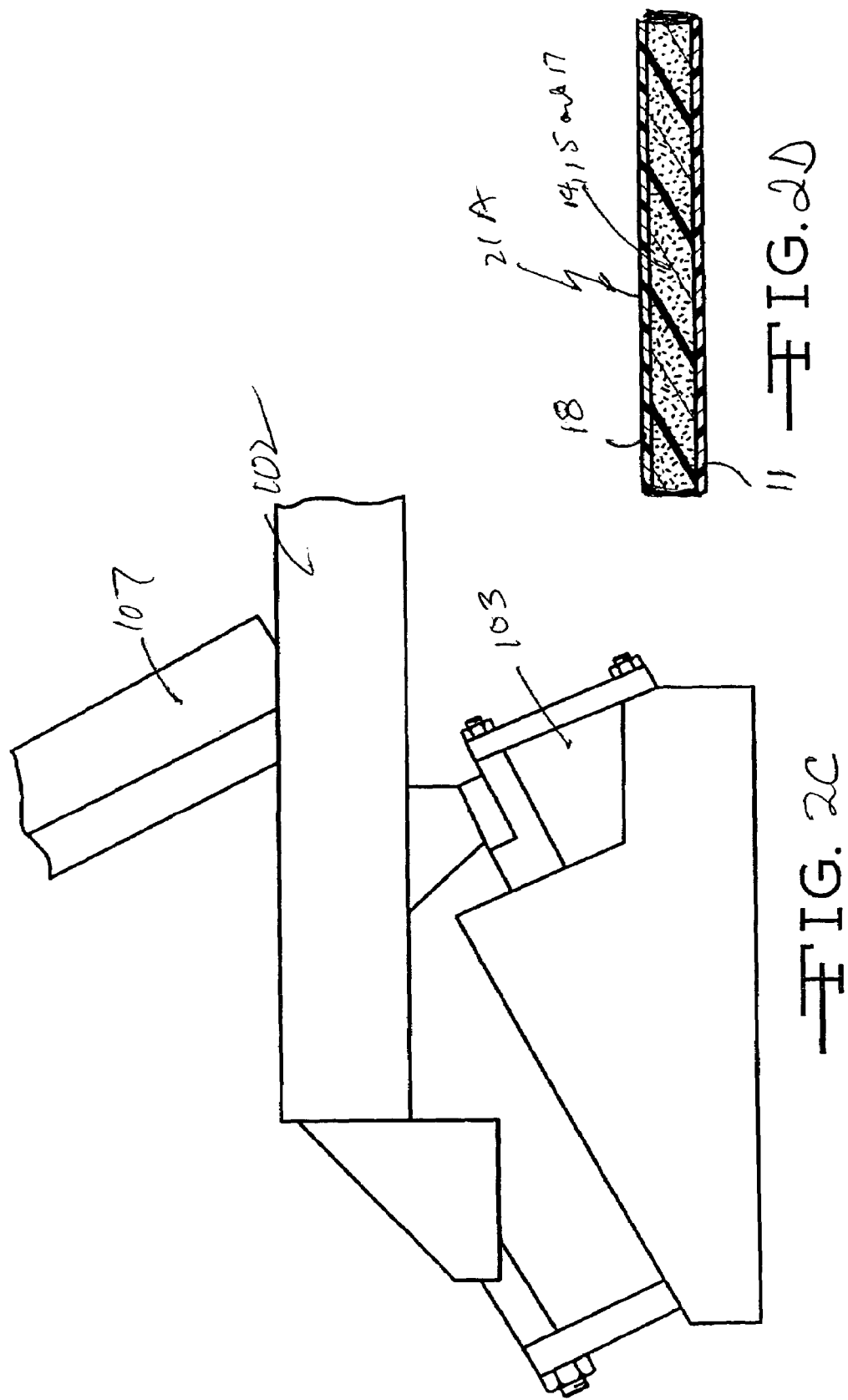

(See Table 1)

BIOCOMPOSITES SHEET MOLDING AND METHODS OF MAKING THOSE

CROSS-REFERENCE TO RELATED APPLICATIONS

This application is based for priority on U.S. Provisional Application Ser. No. 60/511,219 filed Oct. 15, 2003.

STATEMENT REGARDING FEDERALLY SPONSORED RESEARCH OR DEVELOPMENT

The present invention was funded under Natural Science Foundation No. 0122108. The U.S. government has certain rights to this invention.

BACKGROUND OF THE INVENTION (1) Field of the Invention

The present invention relates to sheet molding compounds (SMC) as prepregs which contain biofibers as well as molded products produced from the prepregs. The present invention also relates to an apparatus for producing the mats of the biofibers and the prepregs.

(2) Description of Related Art

Natural and wood fiber plastic composites have continued their phenomenal growth in 2002. As per the recent market study by Principia Partners, the demand of these products in North America and Western Europe combined, will reach nearly 1.3 billion pounds valued at roughly $900 million. This represents a growth of almost 20% from 2001 levels. There is a growing interest in the use of natural/biofibers as reinforcing components for thermoplastics and thermosets. Although thermoplastics have the added potential advantage of recyclability, thermosets are capable of superior mechanical properties compared to thermoplastics in the resulting biocomposites. Biocomposites derived from natural fibers and petroleum-based thermoplastics or thermosets are not fully environmentally friendly because matrix resins are non-biodegradable. However these biocomposites do possess a balance between economics and environment allowing them to be considered for applications in the automotive, building, furniture and packaging industries. Natural fiber composites are mainly price-driven commodity composites that have useable structural properties at relatively low cost. Advantages of natural fibers over traditional reinforcing fibers such as glass and carbon are: low cost, low density, high toughness, acceptable specific stiffness and strength properties, enhanced energy recovery, carbon dioxide sequesterization and biodegradability.

The hydrophilic nature of biofibers is a potential cause for concern in compatibility, adhesion and dispersion problems with hydrophobic polymer matrices. Since the mechanical properties of the composites are dependent on the compatibility and interaction between the components, improvement of the fiber-matrix interface and interphase interactions in natural fiber/polymer composites is essential. Approaches to improve the interaction and thereby the stress transfer between lignocellulosics and polymer resin include, for instance, the use of chemical or physical modifications on the fiber. The use of chemical modifications on natural fiber has drawn attention as adhesion-promoting treatments for the biocomposites. Surface modification of natural fiber with adequate modifiers has been shown to improve compatibility of the natural fibers with plastics.

Biocomposites, in general are materials made by nature or produced synthetically that include some type of natural material in their structure. Biocomposites are also known as natural fiber composites. Biocomposites are formed through the combination of natural cellulose fibers with other materials such as biopolymers or resins or binders based on renewable raw materials. The need is to combine two or more materials in such a way that a synergism between the components results in a new material that is much better than the individual components. The properties of plant fibers can also be modified through physical and chemical technologies to improve performance of the final bio-composite. Some of the plant fibers with suitable properties for making biocomposites are: hemp, kenaf, coir, henequen, jute, flax, sisal, banana, kapok, etc. Biocomposites can be used for a range of applications, for example, building materials, structural and automotive parts, absorbents, adhesives and bonding agents and degradable polymers. These materials can produce a balance between ecology and economy.

Biocomposites have been traditionally manufactured with techniques like extrusion, injection molding, compression molding, resin transfer molding, pultrusion, and like precursors. Biocomposites have not been produced commercially using a Sheet Molding Compound (SMC) process line. SMC is a very useful processing technique usually used for fabricating glass-polyester resin composites. Today more and more automotive parts to skis are being molded from SMC. This is not too surprising since thermoset composite plastics have been used for more than sixty years around the world. A recent U.S. report states that the demand for thermoset composites in the automotive industry will rise by 68 per cent to 467 million pounds by the middle of this decade. The reason is understandable, SMC combines high stiffness and lighter weight. Other advantages of thermoset composites are durability and resistance to corrosion in a wide range of temperature environments. The application of a priming and topcoat allows SMC components to meet automotive 'class A' surface finish requirements and moisture resistance. Processing of SMC by compression molding enables the production of bodywork or structural automotive components and electrical or electronic machine housings in large industrial volumes or body panels (hoods and deck lids). The process also penetrates sectors such as sanitary ware (baths) and urban furniture (stadium and cinema seating), etc. Its characteristics allow SMC to fill a mold under the effects of the molding temperature and pressure.

There have been numerous patents on SMCs. U.S. Pat. No. 3,615,979 granted in 1971 was a patent for glass fiber-reinforced sheet molding compound, by Owens-Corning Fiberglas Corp. U.S. Pat. No. 3,713,927 granted in 1973, thermosetting sheet molding compounds. U.S. Pat. No. 3,835,212 granted in 1974 was a patent for resinous sheet like products. DE 2357000 granted in 1974 was a patent for sheet molding compounds. JP 49076988 granted in 1974 was a patent for unsaturated polyester compositions for moldings. JP 49107086 granted in 1974 was a patent for unsaturated polyester compositions. JP 49107086 granted in 1974 was a patent for unsaturated polyester compositions. JP 50005463 granted in 1975 was a patent for molding of unsaturated polyesters. JP 50008882 granted in 1975 was a patent for molding resin compositions. JP 50014792 granted in 1975 was a patent for sheet molding compositions. JP 50036588 granted in 1975 was a patent for sheet molding compositions. U.S. Pat. No. 3,931,095 granted in 1976 was a patent for fire retardant thermosetting resin composition.

There have been many improvements in the SMC processing since 1970s, and hence many more patents. One patent and two papers talk about SMC processing for biocomposites. These include, US 2003088007 granted in 2003 to Wool et al, which is a patent for sheet molding compound resins from plant oils. van Voorn et al discussed a non automated SMC process for making biocomposites in, "Natural fibre reinforced sheet molding compound", in 2001.Goswami et al, made jute (cloth) reinforced sheets with the help of polyester resin in "Jute reinforced sheets based on shellac filled SMC", in 2003.

The traditional SMC is a combination of chopped glass strands and filled polyester resin, in the form of a sheet. SMC is a fully formulated system (fiber, resin, and additives), which can be molded without additional preparation. Sheet molding compound can be made with random chopped fiber reinforcement, with continuous fibers, or with a mixture of the two. The variety of fiber architectures available for sheet molding compound means a variety of properties can be achieved in compression molded parts. Conventional SMC prepreg is made from chopped glass strands, sandwiched between two layers of film, onto which the filled resin paste has already been applied. The prepreg passes through a compaction system that ensures complete strand impregnation before being wound into rolls. These are stored for a few days at reduced temperatures before molding to allow the prepreg to thicken to a moldable viscosity.

SMC is aged to a state near gelation. The manufacturer allows the SMC to reach an extent of reaction close to gelation because it stabilizes the polymer. This light crosslinking increases viscosity and improves processability of the SMC. This ready-to-mold glass fiber reinforced polyester material is primarily used in compression molding. SMC is also mixed with fiber fillers. SMC is made by dispensing mixed resin, fillers, maturation agent, catalyst and mold release agent onto two moving sheets of carrier film. SMC can be molded into complex shapes with little scrap. It is also called the "raw material" for compression molding. It is suitable for production runs in excess of 10,000 parts per year.

Sheet Molding Compound (SMC) produces highly crosslinked and highly filled systems, in which the polymer component is usually an unsaturated polyester. The molded product combines high modulus with high strength. SMC is less expensive than metal, and also has a lower tooling cost.

An industrial process for producing sheet molding compound (biocomposites) is not available. A research group (From Agricultural Research Center, (ATO), Wageingen University Research Center, The Netherlands) has reported the use of SMC for making biocomposites. The natural fibers in this process are not continuously fed to the SMC line. The feeding is by a batch process. Thus, their process is not fully automated, and hence can't be used in an industrial setting. No other process has been reported in literature for fabrication of biocomposites via SMC.

OBJECTIVES

It is an object of the present invention to provide a Sheet Molding Compound (SMC) process ideally suited for natural fiber biocomposites, because of its uniqueness of fiber dispersion, minimal deterioration of biofibers properties ability to use for natural fibers, automated fiber feeding to the production line, and flexibility with resin formulations. It is finally an object to provide environmental goods for multiple uses in automotive, construction, recreational as well as in furniture industries. These and other applications will become increasingly apparent from the description.

SUMMARY OF THE INVENTION

The present invention relates to a prepreg which comprises: a dried layer of naturally derived fibers which have been dried to less than 10% residual moisture; and a matrix comprising a gelled polyester resin which has been catalyzed to form cured polyester resin intermixed with the fibers, wherein the prepreg is stored at refrigerated temperatures prior to heat and compression curing of the prepreg.

In particular the present invention relates to a sheet forming prepreg which comprises: a first carrier film; a dried layer of naturally derived fibers which have been dried to less than 10% residual moisture; a matrix comprising a gelled polyester resin which has been catalyzed to form a cured polyester resin intermixed with the fibers; and a second carrier film with the mixture of the matrix paste and fibers between the first and second fibers, wherein the prepreg is stored at refrigerated temperatures prior to a heat and compression curing of the prepreg. Preferably the prepreg has a shelf life prior to the curing of the prepreg of at least one day. Preferably the polyester resin has gelled during the refrigeration. Preferably the fibers have been chemically modified to enable reaction with a polyester resin. Preferably the fibers have been treated with a compatibilizer which enables strong adhesion of the prepreg with the fibers at least during curing. Preferably the fibers are chopped. Preferably the fibers are chopped and have a length ranging between 1 mm and 50 mm. Preferably the fibers are as a woven or a non-woven mat. Preferably the fibers are either randomly oriented or preferentially aligned in one direction. Preferably the natural fibers are combined with other fibers either within the mat, or with other mats of a different fiber composition.

The present invention also relates to a process for forming a prepreg which comprises: intermixing a matrix comprising a polyester resin which has been catalyzed to form a cured polyester resin with a dried mat of naturally derived fibers which have been air dried for at least 3 hours; storing the prepreg at refrigerated temperatures prior to curing of the prepreg.

The present invention also relates to a process for forming a cured sheet the improvement which comprises forming a prepreg which comprises: providing a first carrier film; providing a dried mat of naturally derived fibers which have been dried to less than 10% residual moisture; intermixing a matrix comprising a gelled polyester resin which has been catalyzed to form a cured polyester resin with the fibers; and providing a second carrier film with the mixture of the matrix paste and fibers between the first and second fibers; storing the prepreg at refrigerated temperatures prior to heat and compression curing of the prepreg.

Preferably the prepreg has a shelf life prior to the curing of the prepreg of at least one day. Preferably the polyester resin is gelled during the refrigeration. Preferably the fibers have been chemically modified to enable reaction with the polyester resin. Preferably the fibers have been treated with a compatibilizer which enables inter mixing with the polyester at least during curing of the prepreg. Preferably surfaces of the fiber have been chemically modified to react with the polyester resin at least during curing. Preferably the fibers have been chopped. Preferably the chopped fibers have a length ranging between 1 mm and 50 mm. Preferably the fibers are either randomly oriented or preferentially aligned in one direction. Preferably the natural fibers are combined with other fibers either within the mat, or with other mats of different fiber composition. Preferably the fibers have been woven or are non-woven as the mat.

The present invention relates to a heat and pressure cured formed object for prepreg as previously described. The present invention also relates to the process wherein the prepreg is in addition formed and cured into a formed object.

Finally the present invention relates to an apparatus for depositing chopped fibers continuously as a mat on a conveyor surface which comprises: a hopper with a screw feeder for delivering the chopped fibers to an outlet; an inclined fiber distribution feed chute at the outlet of the hopper with a series of rods on the chute which laterally disperse a portion of the fibers along with a shaking means mounted on the chute which vibrates the chute to move the fibers down the incline and off the incline; and a vibratory feeder with a tray below the chute for receiving the fibers from the chute, wherein the fibers are deposited as a mat on the tray and are dispersed from the tray by a slot in the tray allowing the mat as it advances on the tray of the feeder to be deposited onto the conveyor surface.

The shaking means for the chute can be provided by coupling it to the vibratory feeder. Preferably an independent shaking means is mounted on the chute allowing independent control of vibrational force and frequency. Preferably the apparatus in addition includes the conveyor and a production live for forming a sheet molding compound (SMC). Preferably the apparatus would have a pivot point to allow an adjustable incline angle and preferably, the apparatus will be isolated from the mounting frame with rubber shock mounts of desired durometer to eliminate "nodes" (dead spots) and to prevent vibrational attenuation of the fiber distribution chute.

This invention provides biocomposite sheet molding compound processing (BCSMC) for fabrication of biocomposites composed of natural fibers and unsaturated polyester resin. The process uses chopped natural fibers like, hemp, kenaf, pineapple leaf fiber, glass fibers, hybrid fibers, to reinforce unsaturated polyester resin and bioresins in high speed sheet molding compound processing. The process provides results in continuous and high volume manufacture of biocomposites, so that industrial scale production of biocomposites is possible.

DESCRIPTION OF THE DRAWINGS

FIGS. 2, 2A, 2B, 2C and 2D are a schematic views of a vibratory feeder and screw feeder and apparatus.

DESCRIPTION OF PREFERRED EMBODIMENTS

Figure 1:
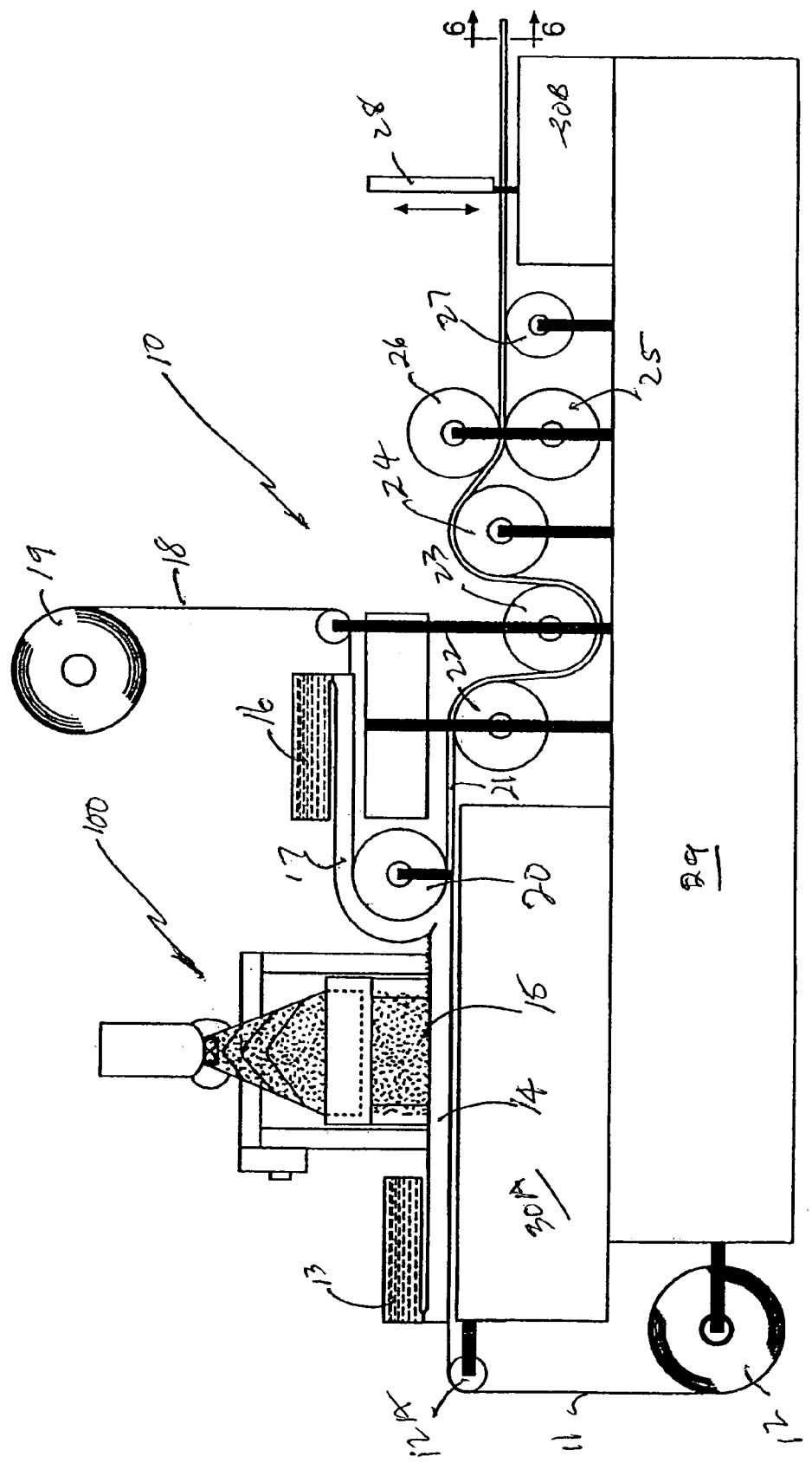
FIG. 1 is a schematic of continuous biocomposite sheet molding compound (BCSMC) manufacture process and apparatus.

A novel high volume processing technique named 'biocomposite stampable sheet molding compound (BCSMC) manufacturing process was developed to produce biocomposites on a large scale, and thus can be easily adopted in numerous industries. Various process parameters are adjusted and optimized for natural fibers. Batch to batch repeatability was established after running numerous experiments with glass fibers and base resin, and adjusting all of the parameters. The prepregs from the SMC line were matured for a desired time and then compression molded. The molded samples were tested for various mechanical and thermal properties in accordance with ASTM procedures. The natural fibers included flax, big blue stem grass, hemp, jute, henequen, kenaf, and were used as reinforcement in an unsaturated polyester resin matrix. The effect of surface treatment of the fibers on thermo-mechanical properties was also investigated. Hybrid biocomposites were also made on the SMC line, using combination of natural fibers. Grass fiber reinforced polyester biocomposites processed by the SMC line showed very promising results. In particular, after treatment with 1% γ-methacryloxy propyltrimethoxy silane, the bending strength and modulus of elasticity of big blue stem grass fiber based SMC biocomposites increased by 15% and 20% respectively as compared to untreated grass fiber biocomposites.

The present invention focuses on large-scale production of biocomposites containing thermoset resins and natural fibers. The equipment used for this processing is similar in construction and function to a common industrial SMC line. Currently, natural fiber reinforced thermoset composites are not prepared using SMC. The present invention aims to use SMC process to fabricate these natural fiber-thermoset composites. In a commercial SMC set-up, continuous glass fiber rovings are fed to a chopper, which cuts them to a 6 mm size, and they fall on the carrier film, forming a uniform layer of chopped glass fibers. Since natural fibers cannot be obtained in a continuous form, and making a continuous yarn or roving with these fibers would be difficult and expensive, chopped natural fibers are used in this new process. The chopped natural fibers are dried for 3–4 hours to remove any ambient moisture, and then fed to a calibrated vibratory feeder. The fibers are first fed into a screw feeder, which delivers these fibers to the vibratory feeder; from which they fall onto the carrier film at a constant flow rate.

The resin formulation is prepared in a Ross mixer. The Ross mixer is connected to cooling water and a liquid polyester precursor and calcium carbonate are combined and mixed for 10 minutes. Cobalt Naphthanate promotor is added and mixed for 5 minutes. Finally the methyl ethyl ketone peroxide (MEKP) as a catalyst is added and mixed for 5 minutes. The Ross mixing pot-cooling water is shut off and disconnected. Resin was transferred into a 3.5 gallon epoxy coated steel storage container. The Ross mixer was then cleaned several times with acetone.

Figure 6:
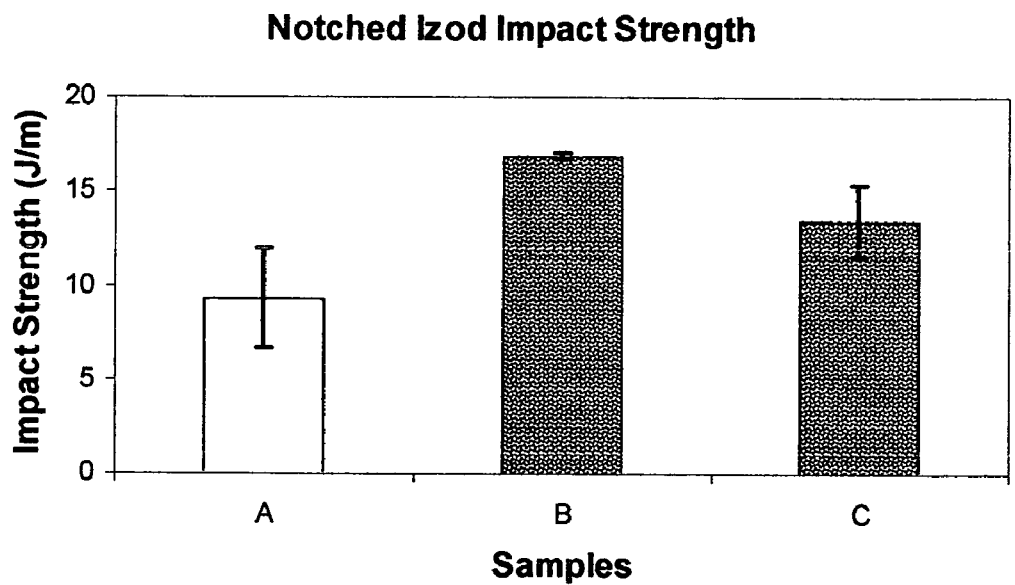
FIG. 6 is a graph showing notched Izod impact strength of composites.
Figure 7:
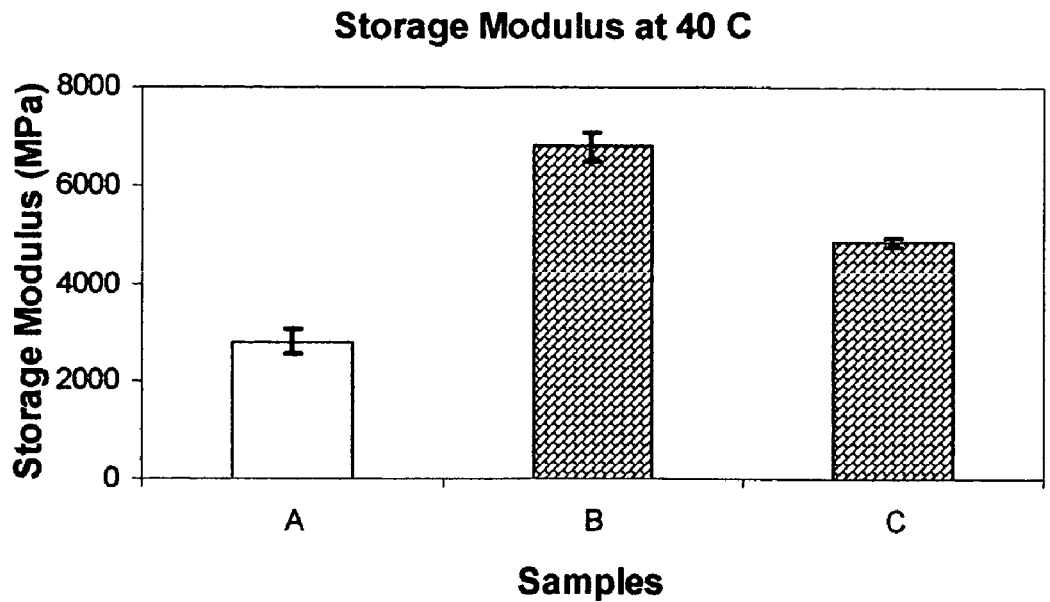
FIG. 7 is a graph showing storage modulus (from Dynamic Mechanical Analysis) of composites at 40 C.

FIG. 1 shows the SMC apparatus 10. A lower carrier sheet 11 is supplied by roll 12 to sheet carrier roll 12A adjacent to carrier support 30A on frame 29. A lower liquid resin pot 13 with a slot (not shown) provided to supply a first resin layer 14 to the lower carrier sheet 11. A vibratory feeder 100, described in detail hereafter, supplies a mat 15 of fibers onto the liquid resin layer 14. An upper resin pot 16 supplies a second resin layer 17 on the mat 15 of fibers on a second carrier sheet 18 from roll 19. A laminating compression roller 20 compresses the lower carrier sheets 11 and 18 together with the resin layers 14 and 17 sandwiching the mat 15 of fibers on the sheets 11 and 18. The compaction rollers 22, 23, 24 and 25 further compact the compressed sheet 21. Friction grip wheel 26 pulls the laminated sheet 21 which can then be cut by cutter 28 or by hand into discrete lengths 21A as shown in FIG. 6 with resin 14 and 17 on the mat 15.

The apparatus thus produces discrete lengths of the SMC which are stored at refrigeration temperatures to gel cure prior to fully curing the SMC at elected longitudes and pressures.

The vibratory feeder apparatus 100 is shown in FIGS. 2, 3, 4 and 5 and conveys the mat 15 of chopped fibers to the apparatus 10. The feeder includes a support frame 101 table on wheels (not shown) to match the apparatus 10. The frame 101, a vibratory feeder tray 102 is mounted and is moved in a reciprocating manner by moving slowly forward and rapidly back in a known manner by motors 103 and 103A. A speed motor determines the speed of the tray 102. The tray has a slot 102A for feeding chopped fibers to the apparatus 10. The fibers are fed from a twin screw feeder 106 to a chute 107. The fibers are fed to a hopper 105 into the twin screw feeder 106. The hopper 105 is connected to the frame 101 through rubber isolation washer 105A and rod 105B. The chute 107 has molded V shaped arms 108 which spread out to the width of the tray 102 which direct the flow of chopped fibers onto the tray 102 in a more even distribution across the width of the tray 102 as shown in FIG. 2A. Thus a more uniform mat of fibers is delivered to the apparatus 10 in the continuous manner. The frame 101 can be supported by a telescoping table (not shown) for height-adjustment.

The chute 107 is independently vibrated by vibrator 109 which is preferably a ball rotating in a race (not shown) in head 110 produced by air lines 111. Thus allows the chopped fibers to be vibrated down the chute 107 onto the tray 102 and out through the diagonal slot 102A onto the first resin layer 14.

Figure 2:
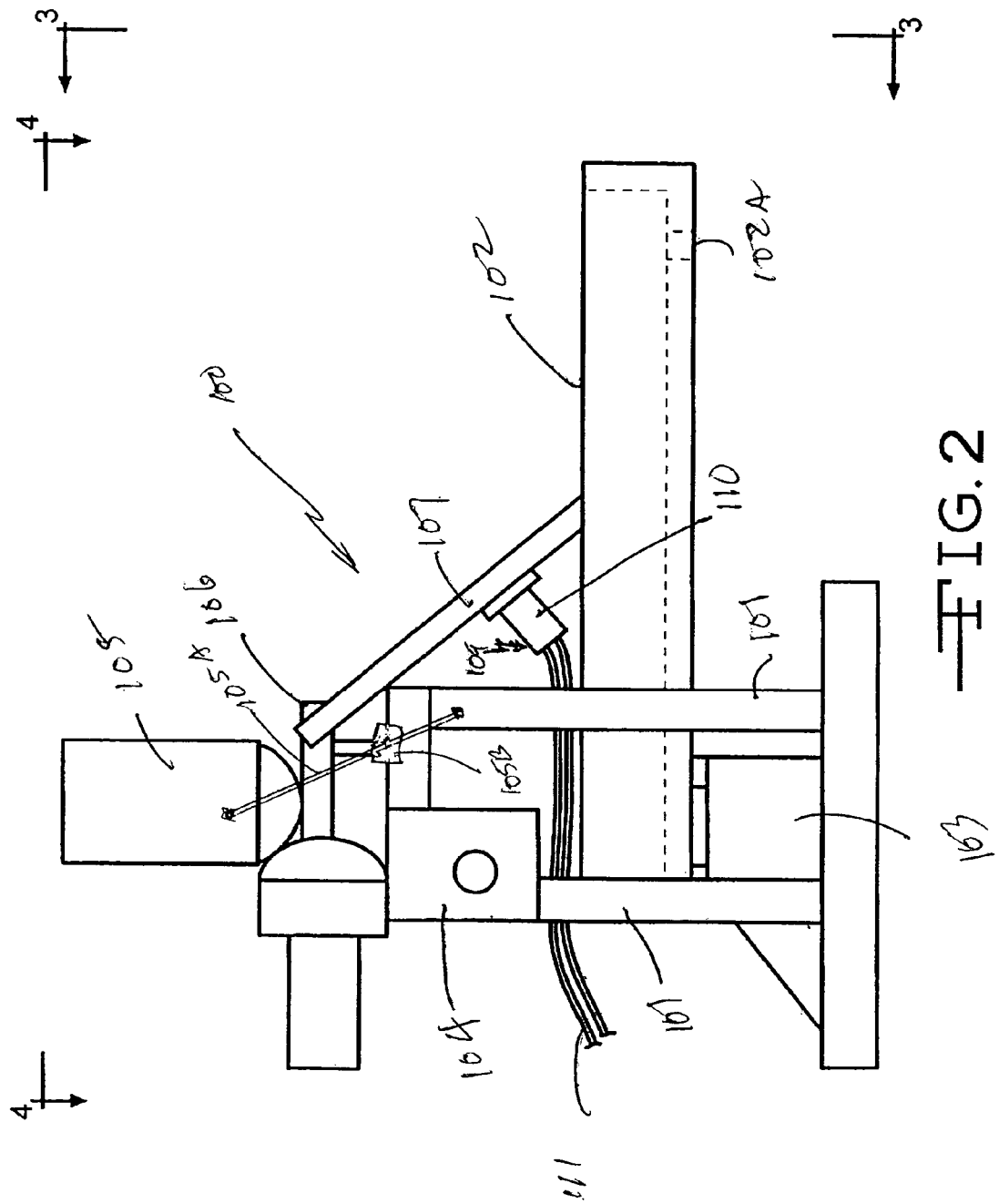
Figure 2A:
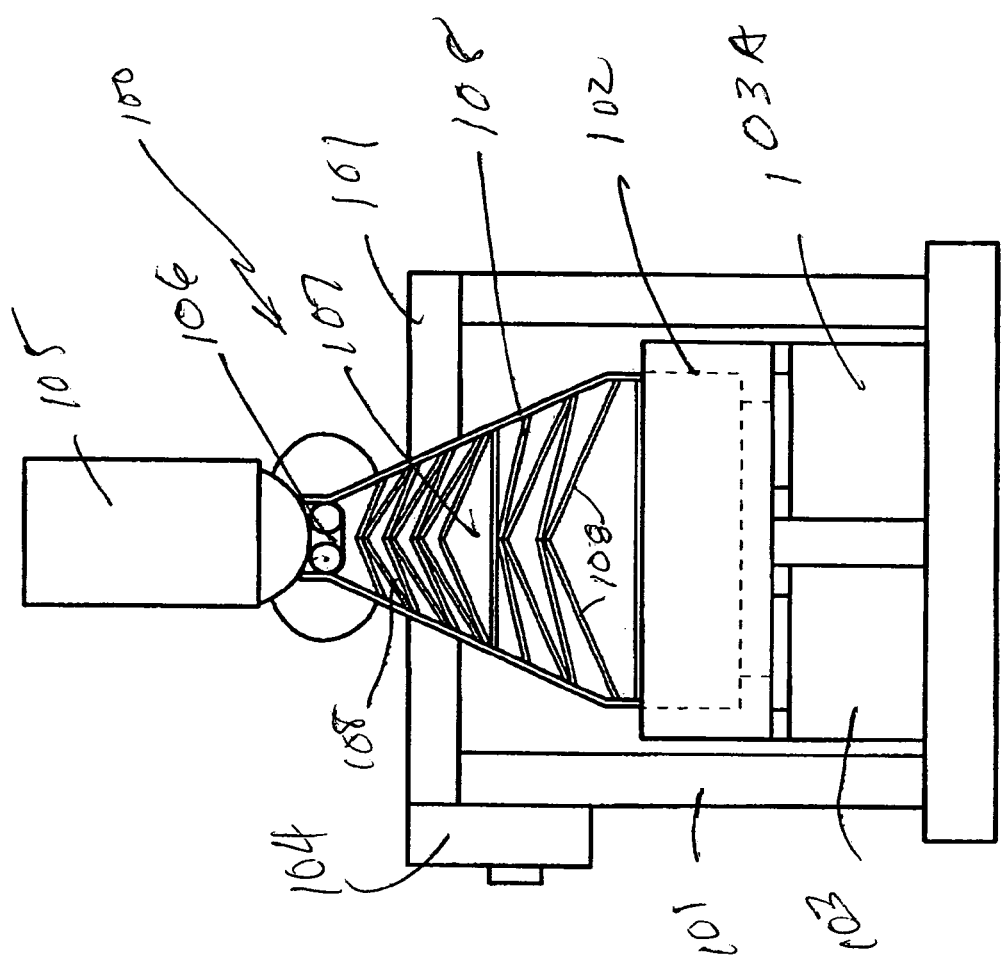
FIG. 2A is a cross sectional view of a SMC cut sheet 21A.
Figure 2B:
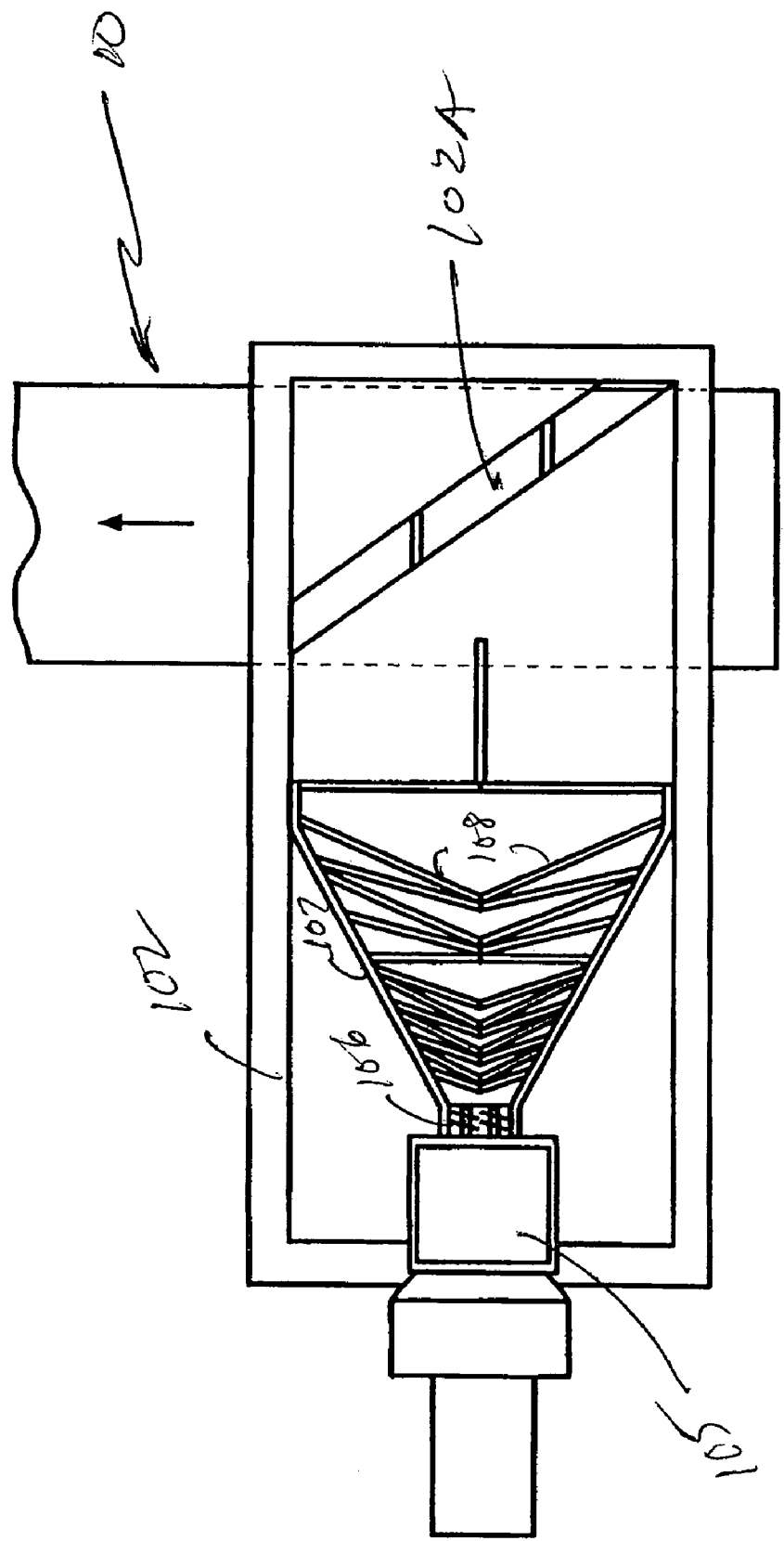

The twin-screw feeder 106 and vibratory feeder 102 were turned on as in FIGS. 2 to 2D. The SMC apparatus of FIG. 1 is turned on shortly before the upper and lower resin pots were filled and were run at an optimum speed. The process was allowed to run to see what the product looked like after compaction by the rollers. The product appeared uniform in thickness and the fiber distribution in the product appears even. Several feet of the product are produced at these settings.

The finished product is cut into 1 ft long segments 21A (FIG. 6) and was placed flat in a sealed polyethylene container. This container was labeled with the date and time and was immediately put into a freezer for storage. Gel time of the resin formulation is observed to be approximately 2 hr 30 min at room temperature (25 C). Gel time during refrigeration was less than one day.

Various process parameters, for example, line speed, cutter pressure, idler roll pressure, wipe blade gap height upper, wipe blade gap height lower, compaction roller pressure, compaction roller gap, grip assembly, twin screw feeder, and the like were adjusted and optimized for the natural fibers. The prepregs from SMC line were matured for desired time and then compression molded. The molded samples were tested for various mechanical, and thermal properties, in accordance with ASTM procedures.

Batch to batch repeatability was established after running numerous experiments with glass fibers and base resin, and adjusting all of the parameters.

FIG. 1 shows the schematic of the proposed invention. The process begins with an upper and lower supply roll of carrier film material. The upper and lower carrier film is fed beneath the upper and lower resin pots respectively, which deposits a pre-determined thickness of resin onto the carrier film by means of adjustable height wipe blades. The lower carrier sheet then passes beneath the bio-fiber vibratory feeder, which deposits a calibrated weight % of bio-fiber uniformly onto the surface of the resin. The upper and lower carrier sheets are then brought together creating a sandwiched SMC sheet material. The sheet material is then fed through compaction rollers to help provide a uniform sheet cross section and to also provide some mixing forces to ensure the even distribution of fiber in the resin. A grip wheel near the end of the line provides the necessary mechanical force to pull the sheet material through the system at a controlled rate. The sheet material is then cut to the desired length.

Feeder Description

The bio-fiber feeder system consists of four main components:
1.) The material feed hopper
2.) The twin screw feeder
3.) The fiber distribution feed chute
4.) The vibratory feeder Bio-fiber is put in the hopper for feeding. The fiber is then fed onto the fiber distribution feed chute by the twin-screw feeder, which is calibrated to output the required fiber weight/minute. The fiber distribution chute spreads the fiber out uniformly from the width of the twin feeding screws to the width of the vibratory feeder. The vibratory feeder then conveys the fiber to the opening at the end of the feeder tray providing the uniform distribution of fiber onto the SMC sheet.

This new processing has been used to make various bio-composite samples with different composition and weight fraction of natural fibers and polyester resin. The process has been optimized for natural fibers after many experimentations and repetitions. This process has been used with glass fibers and polyester sized glass fibers as controls, big blue stem grass fibers, silane sized big blue stem grass fibers and hemp fibers. Unsaturated polyester resin, calcium carbonate, methyl ethyl ketone peroxide (MEKP) and cobalt naphthenate were used in the matrix for these composites.

Figure 3:
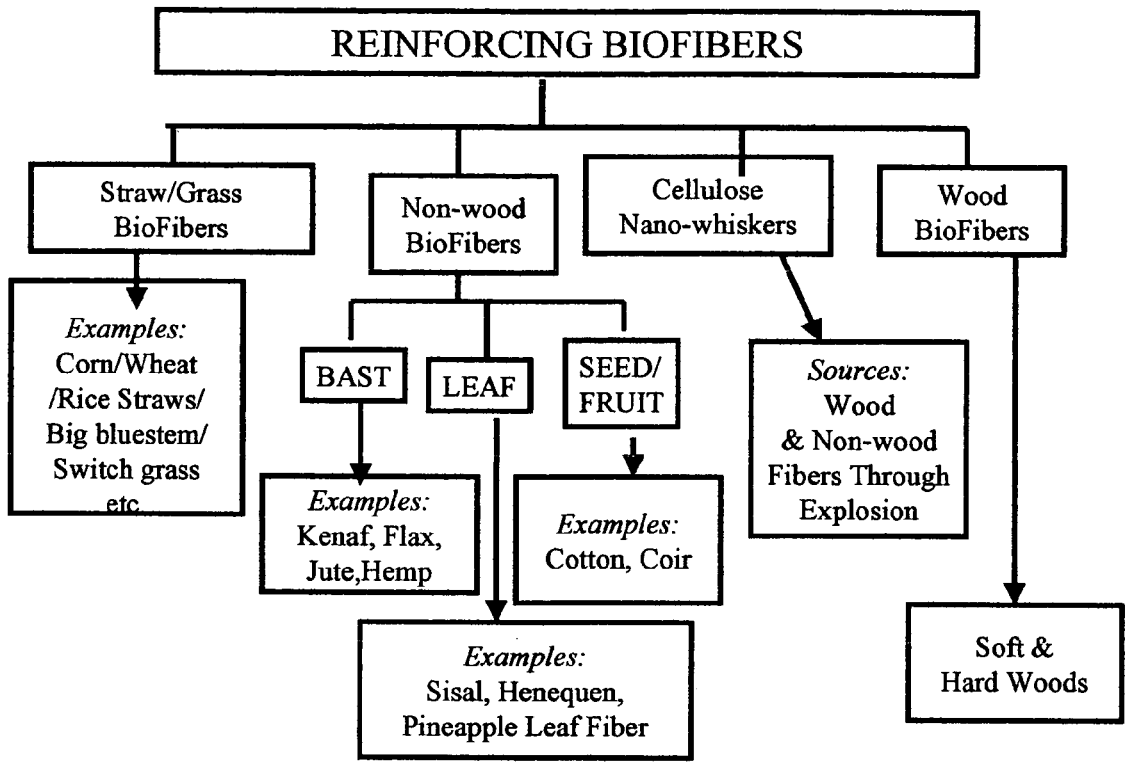
FIG. 3 is a chart showing various biofibers used as reinforcement in the current invention.
Figure 4:
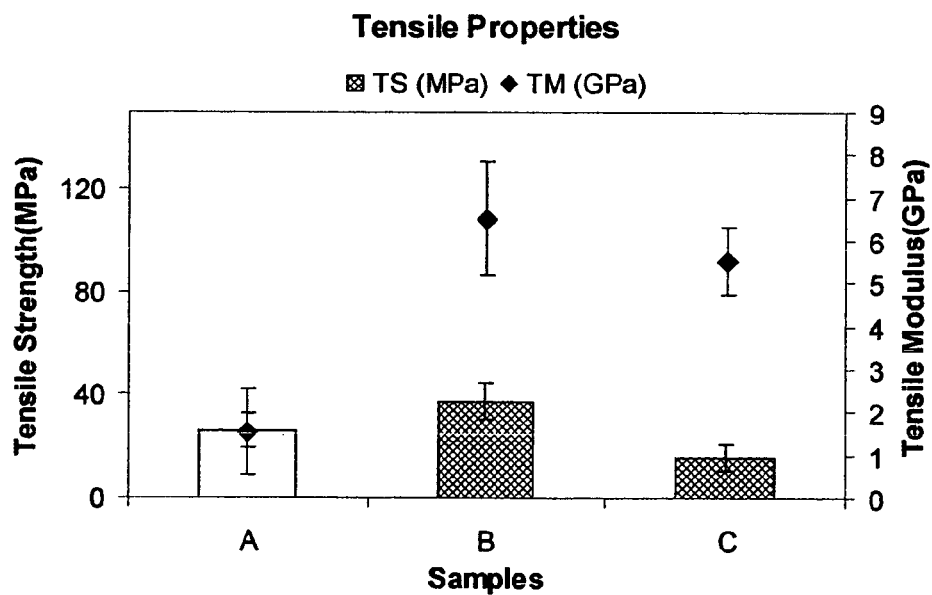
FIG. 4 is a graph showing tensile properties of composites.
Figure 5:
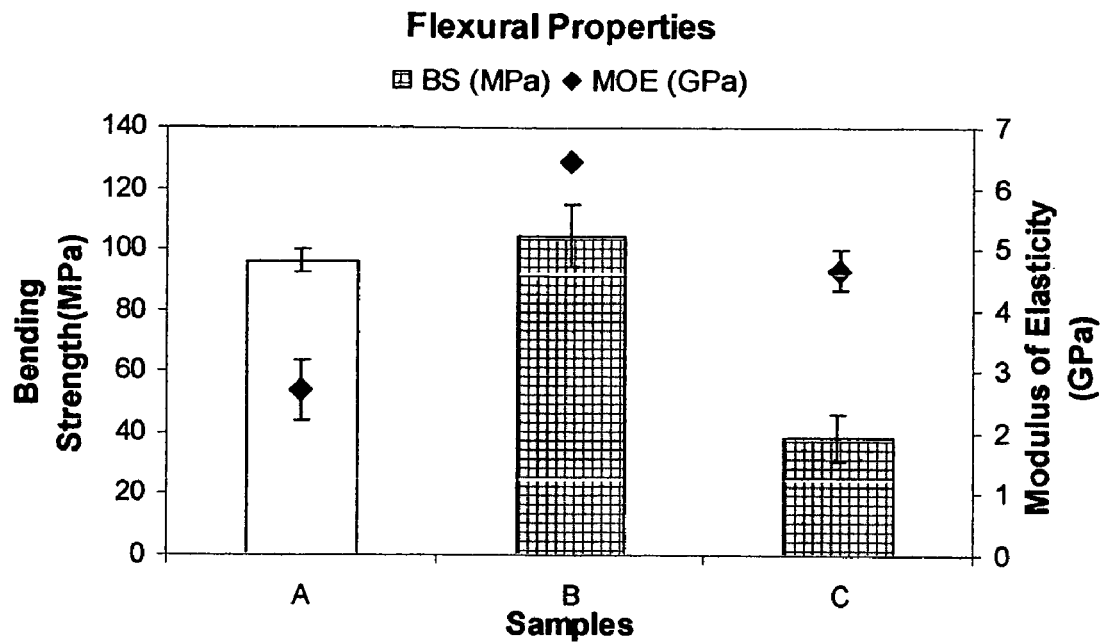
FIG. 5 is a graph showing flexural properties of composites.

This process can be used for making biocomposites using the following fibers: Indian grass, kenaf fibers, hemp fibers, pineapple leaf fibers, henequen fibers, jute fibers, flax fibers, ramie fibers, alpha fibers, other cellulosic fibers, engineered natural fibers, and also a hybrid mix of glass fibers and natural fibers. Examples of various fibers used in the current invention are shown in FIG. 3.

Unsaturated polyester resin has used as well as bioresins based on various plant oils like soybean oil, linseed oil, castor oil, etc. For making the engineered natural fibers, an optimum combination of bast fibers (hemp, kenaf, flax, jute, and the like) and leaf fibers (henequen, pineapple leaf fibers, sisal, etc.) were used to achieve a balance between stiffness and toughness of the resulting bio-composite. Proper sizing of the natural fibers improved adhesion between fibers and matrix. Other additives like impact modifiers, low profile additives, flame resistant materials, can be included in the formulation to get desired mechanical properties of biocomposites for structural and other infrastructural applications.

FIGS. 4, 5, 6, 7, and 8 show the mechanical and thermal properties of the composites, including natural fiber-unsaturated polyester resin (UPE) composites and SMC processed biocomposites.

Figure 8:
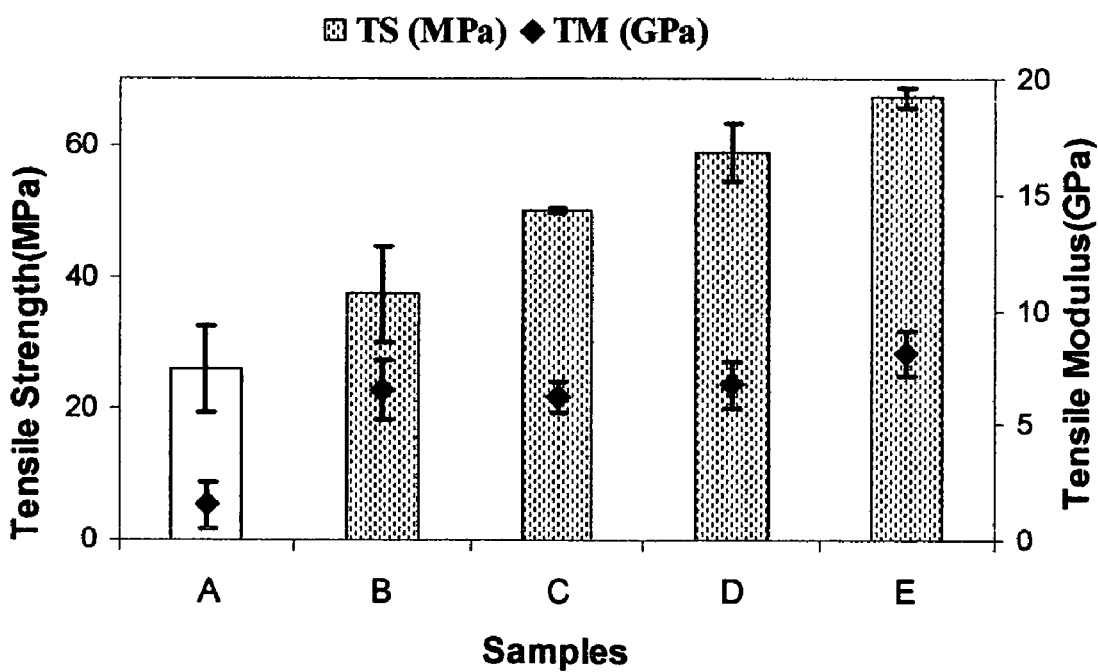
FIG. 8 is a graph showing the effects of surface treatment on the mechanical properties of natural fibers based.
Figure 9A:
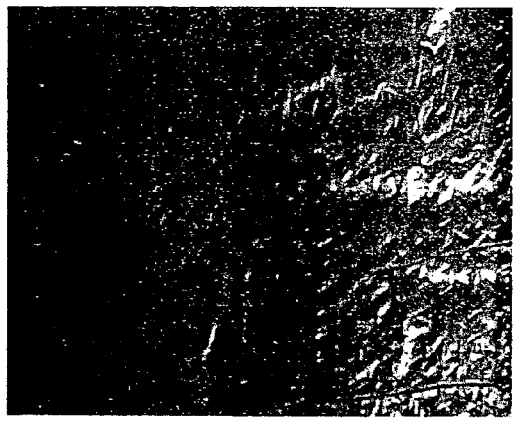
FIGS. 9A to 9E are photographs of an $CaCO_3$-UPE composite.
Figure 9B:
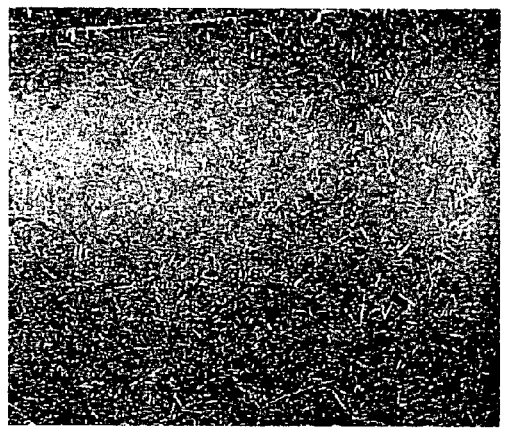
Figure 9D:
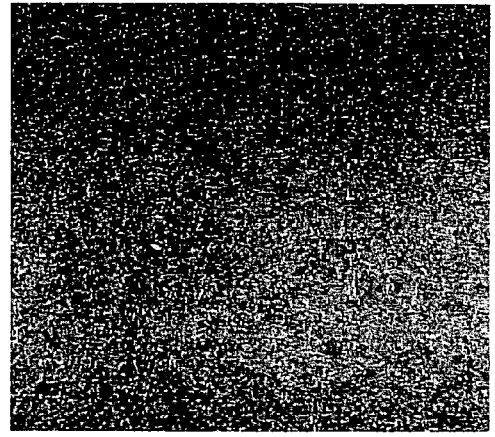
Figure 9C:
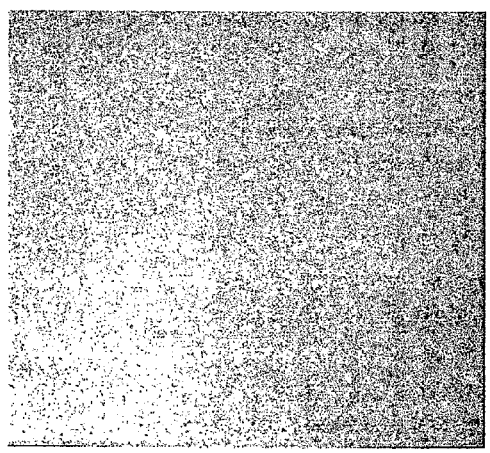
Figure 9E:
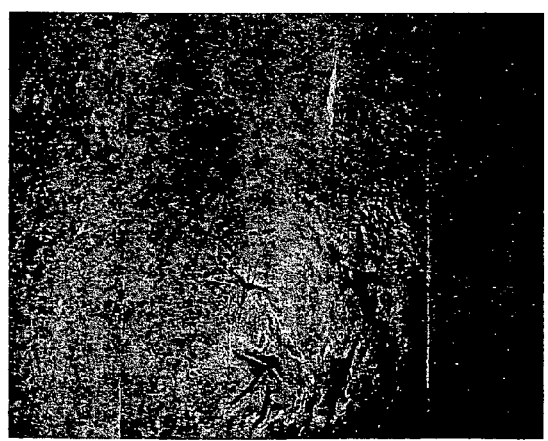
Figure 10A:
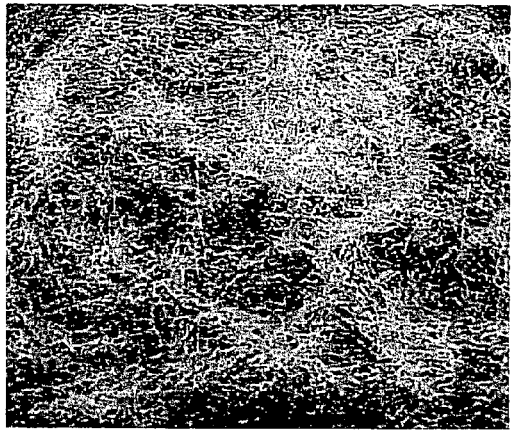
FIGS. 10A to 10D are photographs of composite samples made using SMC line.
Figure 10C:
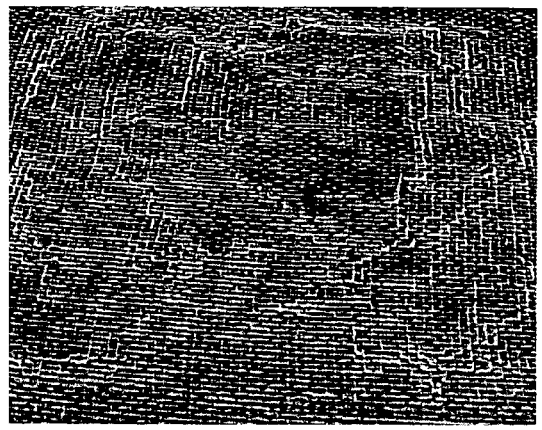
Figure 10B:
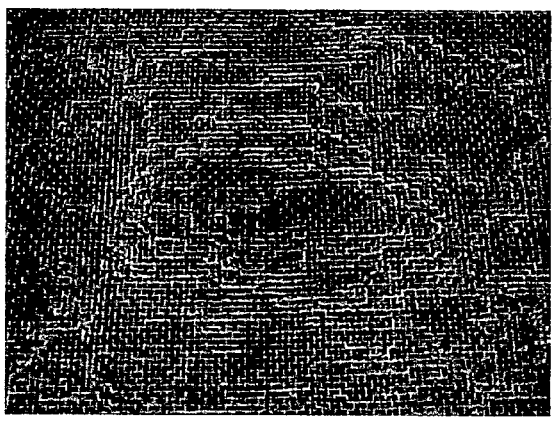
Figure 10D:
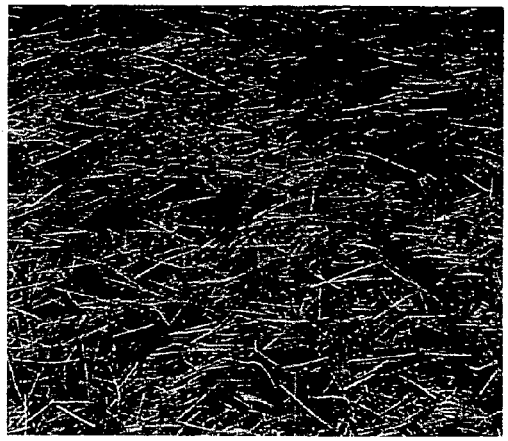
Figure 11A:
FIGS. 11A to 11F are photographs of composite samples prepared using SMC line.
Figure 11:
Figure 11B:
Figure 11E:
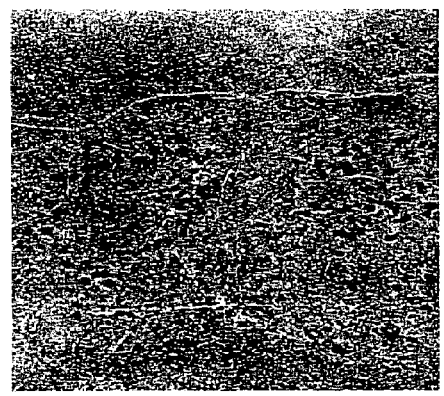
Figure 11C:
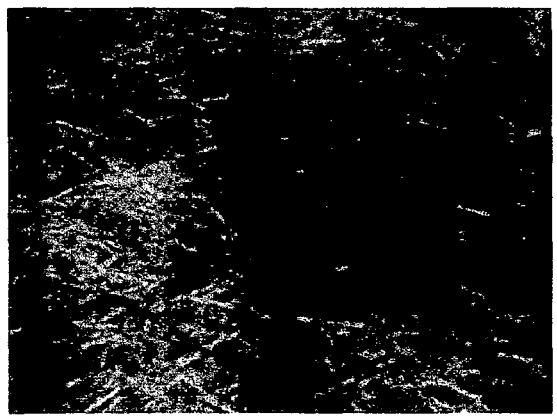
Figure 11F:

The modulus of elasticity, tensile modulus and storage modulus of big blue stem-UPE-$CaCO_3$ bio-composite are higher than the UPE. The flexural and tensile strength of this SMC processed bio-composite can be improved by proper surface treatment, and using a bigger fiber size for fabrication of composites. As depicted in FIG. 8, the mechanical properties of biocomposites can be improved by proper surface treatments.

COMPARATIVE EXAMPLES

Material Development and Characterization

Example 1

Experiments were done with glass fibers to ensure that the composites developed using SMC process had consistent properties. An unsaturated polyester resin compatible glass roving, Owens Corning 985, was used for making composites. Other glass fibers like Owens Corning 485, and other sized glass fibers were not compatible with polyester resin. The major goal of the run was to produce 0.188 thick SMC using Owens Corning 985 E-glass and then to compression mold the resultant sheet material. The resulting glass composites were of the following composition: glass fibers 30 wt %, $CaCO_3$ 42 wt %, and UPE 28 wt %.

The runs were conducted using the following parameters:

Line speed—Dial setting of 1.5, about 0.3 in/sec

Glass cutter—Dial setting of 3.2, approx. 223 g/min (31% by weight)

Four tows were fed into a glass cutter to improve glass distribution

Cutter Pressure—40 psi

Idler roll pressure—56 psi

Wipe blade gap height upper—0.060"

Wipe blade gap height lower—0.060"

Compaction roller pressure—30 psi

Compaction rollers shimmed to ensure a minimum 0.250 gap

Upper carrier sheet roller shimmed to a gap of 0.265

Upper resin tray assembly shimmed up 0.500

Grip assembly used with slight preload on roller for friction

Experimental Procedure

A total of 8971.3 g of resin was mixed shortly before the SMC run using the following formulation:

| | |
|---|---|
| 40% Unsaturated Polyester Resin | 3580.92 g |
| 60% Calcium Carbonate Filler | 5371.38 g |
| 0.03% Cobalt Naphthanate Promoter | 1.074 g |
| 0.5% MEKP | 17.90 g |

The Ross mixer speed dial was set to 5.0. Cooling water to the mixing pot was connected and turned on. The polyester and calcium carbonate were combined and mixed for 10 minutes. The Cobalt Naphthanate was added and mixed for 5 minutes. Finally the MEKP was added and mixed for 5 minutes.

The Ross mixing pot cooling water was shut off and disconnected. Resin was transferred into a 3.5 gal epoxy coated steel storage container. The Ross mixer was then cleaned several times with acetone using blue WypAll Plus™ all-purpose wipes.

The SMC line was turned on shortly before the upper and lower resin pots were filled and was run at a speed of 0.3 in/sec. The glass cutter was then turned on. The process was allowed to run to see what the product looked like after the compaction rollers. The product appeared uniform in thickness and the glass distribution in the product appeared even. Several feet of product were produced at these settings.

From the point where the MEKP was introduced into the resin, a total time of approximately 45 minutes elapsed including cleanup time. The finished product was cut into 1 ft long segments and was placed flat in sealed polyethylene container. This container was labeled with the date and time and was immediately put into a freezer for storage. Gel time of the resin formulation was observed to be approximately 2 hr 30 min.

After the prepreg were frozen at −10 C, it was compression molded in a Carver Press. The prepregs were placed in a picture frame mold, and placed between two aluminum plates lined with Teflon sheets. This sample was cured at around 80 psi for 2 hours at 100° C. followed by 2 hours at 150° C. The resulting composite is cut into desired shapes for various tests.

For making the control sample, a degassed UPE solution was poured into degassed silicone molds and cured in a conventional oven at the same curing conditions.

Glass fiber composites were fabricated using SMC until consistent materials with same mechanical properties were obtained. The parameters mentioned for this particular run were obtained after optimization. Data from two SMC runs with glass fibers, after all optimizations, are discussed in the upcoming section.

Example 2

Experiments were performed to produce biocomposites using the SMC line. The major goal of these runs was to produce sheet material using natural fibers as the reinforcement.

The natural fibers were vacuum dried overnight at 80° C. and −102 kPa, before being used in the bio-composite fabrication. Some composites were made with untreated fibers as such, and some were made with chemically treated fibers. In particular, silane treatment was used on big blue stem grass and green flax core. The silane treatment of these fibers was done in the following way:

A 1% methacryloxypropyltrimethoxy silane (γ-MPS) solution was made in 99% DI water and Ethanol (1:1) while maintaining the pH of the solution at 4.0 by using 2% Glacial Acetic Acid. The silane solution was hydrolyzed for 2 hours by continuously stirring using a magnetic stir bar. The fibers were soaked in this solution for 1 hour. The solution was then drained from the fibers, and they were dried under a hood for at least one day. They were then cured in an air oven for 5 hours at 80° C. The fibers were then dried in a vacuum oven at 80° C. and −30 in Hg for 5–16 hours.

When two fibers were used for making hybrid biocomposites, the fibers were mixed well by continuous agitation, and the resulting uniform mixture was vacuum dried before using to make biocomposites.

The natural fibers had to be introduced into the SMC line in a different way as compared to glass fibers. They were fed by the combination of twin screw feeder and vibratory feeder of FIGS. 2 to 2C. This way of fiber introduction was optimized after various attempts with vibratory feeding.

The resulting biocomposites contained 20 wt % fiber, 30 wt % $CaCO_3$, and 60 wt % UPE. This composition is different from that of glass composites discussed earlier, because natural fibers have a tendency to soak up resin. As the natural fibers are hollow, when they are mixed with resin, they absorb resin in their interstitial paces. An experiment was done to measure the amount of resin absorbed by big blue stem fiber. It was found that 1 gram of fiber absorbed 1.85 grams of resin (average of three readings).

The experimental runs were conducted using the following parameters:

Line speed—Dial setting of 1.5 (0.3 in/sec)=(18 in/min)
K-tron twin screw feeder—Hi gear with a digital readout setting of 550 RPM
Vibratory feeder dial setting—100%
Feeders calibrated to approximately 101 g/min. (20% fiber content) over the 12" wide resin coverage area
A modified fiber spreading dispersion tray was used to spread fibers to the vibratory feeder 18" width
Wipe blade gap height upper—0.050"
Wipe blade gap height lower—0.050"
Compaction roller pressure/Open Position—30 psi
Compaction rollers shimmed to ensure a minimum 0.250 gap
Upper carrier sheet roller shimmed to a gap of 0.265
Upper resin tray assembly shimmed up 0.500
Grip assembly was used with slight preload on roller for friction
Big Blue Stem Grass fiber and Flax fiber was dried for approximately 16 hrs in a vacuum oven at approximately 80 C before run Experimental Procedure A total of 6560 g of resin was mixed shortly before the SMC run using the following formulation:

| | |
|---|---|
| 60% Unsaturated Polyester Resin | 5182.76 g |
| 30% Calcium Carbonate Filler | 1350.00 g |
| 0.03% Cobalt Naphthanate Promoter | 1.56 g |
| 0.5% MEKP | 26.06 g |

The Ross mixer speed dial was set to 5.0. Cooling water to the mixing pot was connected and turned on. The polyester (polymer) and calcium carbonate were combined and mixed for 10 minutes. The Cobalt Naphthanate was added and mixed for 5 minutes. Finally the MEKP was added and mixed for 5 minutes.

The Ross mixing pot cooling water was shut off and disconnected. Resin was transferred into a 3.5 gal epoxy coated steel storage container. The Ross mixer was then cleaned several times with acetone using blue WypAll Plus™ all-purpose wipes.

The SMC line (FIG. 1) was turned on shortly before the upper and lower resin pots were filled and was run at a speed of 0.3 in/sec. Resin was then transferred to the resin pots. The K-tron twin screw feeder and vibratory feeder (FIGS. 2 to 2C) were then turned on. The process was allowed to run to see what the product looked like after compaction by the rollers. The sheet material looked very good. The feeder setup of FIGS. 2 to 2C distributed fiber evenly and consistently. Several feet of product was produced at these settings.

The resultant sheet material looked very good. Fiber dispersion uniformity from the modified dispersion tray setup was good, but could be better if the air pressure could steadily supply more air pressure to the vibrator. The pneumatic rotary vibratory feeder on the dispersion tray was set to 75 psi, but the air supply had trouble keeping up pressure after a period of time. A drop in pressure was not observed until the run was complete. 90 psi provided the best fiber distribution but was not sustainable for more than a minute or so.

The finished product was cut into 1 ft long segments and, was placed flat in a sealed polyethylene container. This container was labeled with the date and time and was immediately put into a freezer for storage. After cooling in the freezer for several hours, the sheet material was compression molded in the Carver press for mechanical testing. The testing was as shown in Table 1. FIGS. 9A to 9E and 10A to 10D show various cured products of the SMC live.

TABLE 1

Samples made using SMC line

| Sample | Fiber 1 | Fiber 2 | Fiber 1 wt % | Fiber 2 wt % | CaCO3 wt % | UPE wt % | Bioresin wt % | TOTAL % |
|---|---|---|---|---|---|---|---|---|
| A | Untreated BBSG | | 20 | | 20 | 60 | 0 | 100 |
| B | Silane treated BBSG | | 20 | | 20 | 60 | 0 | 100 |
| C | Untreated BBSG | Untreated green flax core | 8 | 12 | 20 | 60 | 0 | 100 |
| D | Silane treated BBSG | Silane treated green flax core | 8 | 12 | 20 | 60 | 0 | 100 |
| E | Untreated green flax core | | 20 | | 20 | 60 | 0 | 100 |
| F | Untreated hemp | Untreated jute mat | 18 | 7 | 20 | 55 | 0 | 100 |
| G | Untreated hemp | Untreated jute mat | 13 | 7 | 20 | 60 | 0 | 100 |

TABLE 1-continued

Samples made using SMC line

| Sample | Fiber 1 | Fiber 2 | Fiber 1 wt % | Fiber 2 wt % | CaCO3 wt % | UPE wt % | Bioresin wt % | TOTAL % |
|---|---|---|---|---|---|---|---|---|
| H | Untreated hemp | E-glass mat | 12 | 8 | 20 | 60 | 0 | 100 |
| I | E-glass | | 20 | | 20 | 60 | 0 | 100 |
| J | E-glass mat | | 30 | | 0 | 50 | 20 | 100 |
| K | Untreated hemp | | 35 | | 0 | 65 | 0 | 100 |
| L | Untreated henequen | | 35 | | 0 | 65 | 0 | 100 |
| M | Untreated kenaf | | 35 | | 0 | 65 | 0 | 100 |
| N | Untreated hemp | Untreated henequen | 25 | 10 | 0 | 65 | 0 | 100 |
| O | Untreated kenaf | Untreated henequen | 25 | 10 | 0 | 65 | 0 | 100 |
| P | Untreated hemp | Untreated henequen | 20 | 10 | 0 | 50 | 20 | 100 |

BBSG = big blue stem grass

The biocomposites and control samples are used for tensile, flexural and notched Izod impact tests complying with ASTM D638, ASTM D790 and ASTM D 256 standards, respectively. A United Calibration Corp SFM—20 testing machine was used for tensile and flexural testing. The impact test was carried out using an impact tester from Testing Machines Inc. 43-OA-01.

The fibers and impact-fractured surfaces of composites are investigated using Environmental Scanning Electron Microscopy (ESEM). The ESEM used for this work was manufactured by Electroscan Corporation (Model no. 2020). It is equipped with a Lanthium Hexaboride filament. Water vapor acts as the imaging gas. The samples to be examined were placed in a sample holder located in the sample chamber. The imaging pressure (Chamber pressure) was set between 2–3 Torr. The working distance between the detector and the sample was set between 8–10 mm. The accelerating voltage was set to 20 kV. The sample was focused at different points in its area, and micrograph pictures were taken at different magnifications.

Dynamical Mechanical Analyzer (TA DMA 2890) measured the storage modulus, loss modulus and tan delta. For DMA testing, rectangular bars, 50 mm×12 mm×3 mm are placed on the 3 point bending fixture in the furnace and heated at 4° C. per minute from room temperature to 150° C.

The fibers are characterized using TGA, DSC and XPS. Hi-Res TGA 2950 TA was used for finding variation of sample weight and derivative weight with temperature. The finely chopped fibers were kept in an aluminum sample pan which goes inside the furnace. It was programmed to raise the temperature from room temperature to 600 C at the rate of 20° C. per minute.

TA 2920 Modulated DSC was used for studying thermal transitions of fibers. A reference aluminum pan and a sample pan were kept inside the furnace, which was programmed to go from −60° C. to 300° C. at the rate of 10° C. per minute.

X ray photoelectron spectroscopy (XPS) was used to study the surface of untreated and chemically treated natural fibers.

For Glass Composites:

The glass fiber polyester resin composites from the SMC line were tested for mechanical and thermal properties including, bending strength, modulus of elasticity, storage modulus and tan delta.

Figure 12:
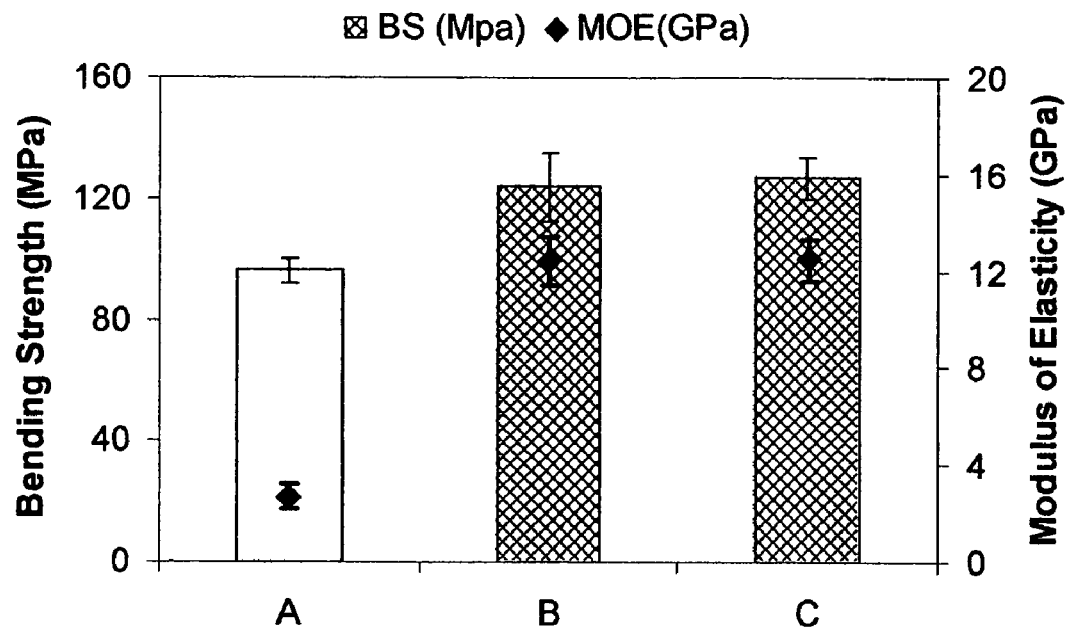
FIG. 12 is a graph showing flexural properties of composites.

The flexural properties of composites are shown in FIG. 12. There was consistency in the data for samples B and C, which represented glass composites made using SMC processing. This was a verification of the fact that SMC process had been optimized for Glass-UPE-CaCO3 system. The bending strength and modulus of elasticity for samples B and C are almost the same at 125 MPa, and 12.5 GPa, respectively. The bending strength of glass composites was 32% more than that of UPE control, while their modulus of elasticity was 370% more than neat polyester resin.

Figure 13:
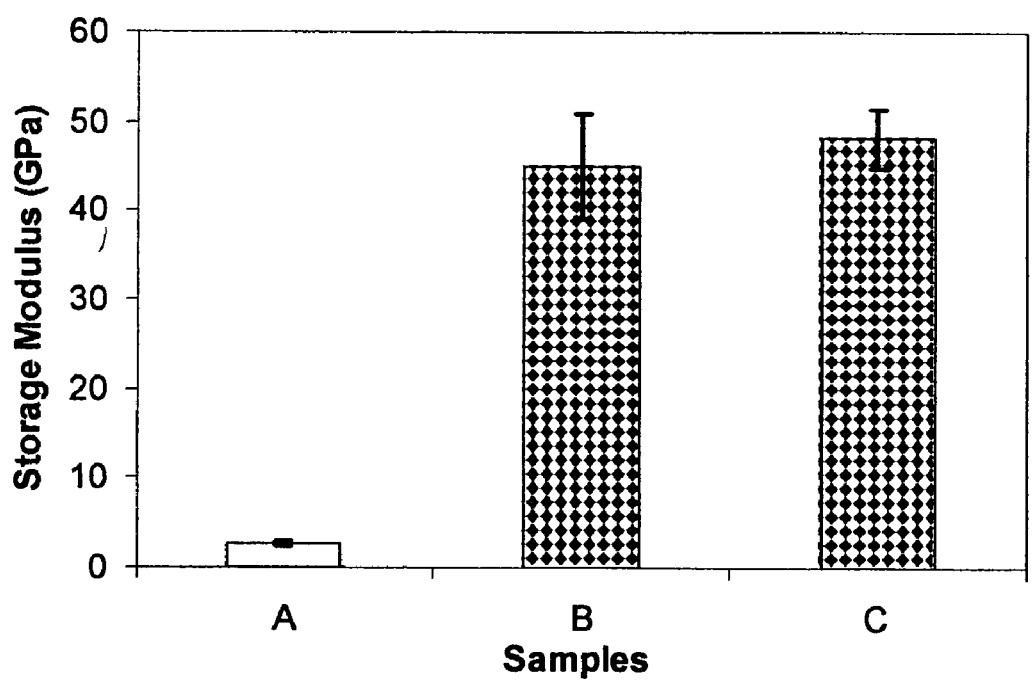
FIG. 13 is a graph showing storage modulus of composites at 40 C.

The storage modulus of fiber-UPE composites at 40 C is shown in FIG. 13. Again, both B and C have almost the same values of storage modulus. As compared to UPE control A, composites on B and C had very high storage modulus, (1600% more than that of neat polyester) which reflected high stiffness of glass fibers.

Figure 14:
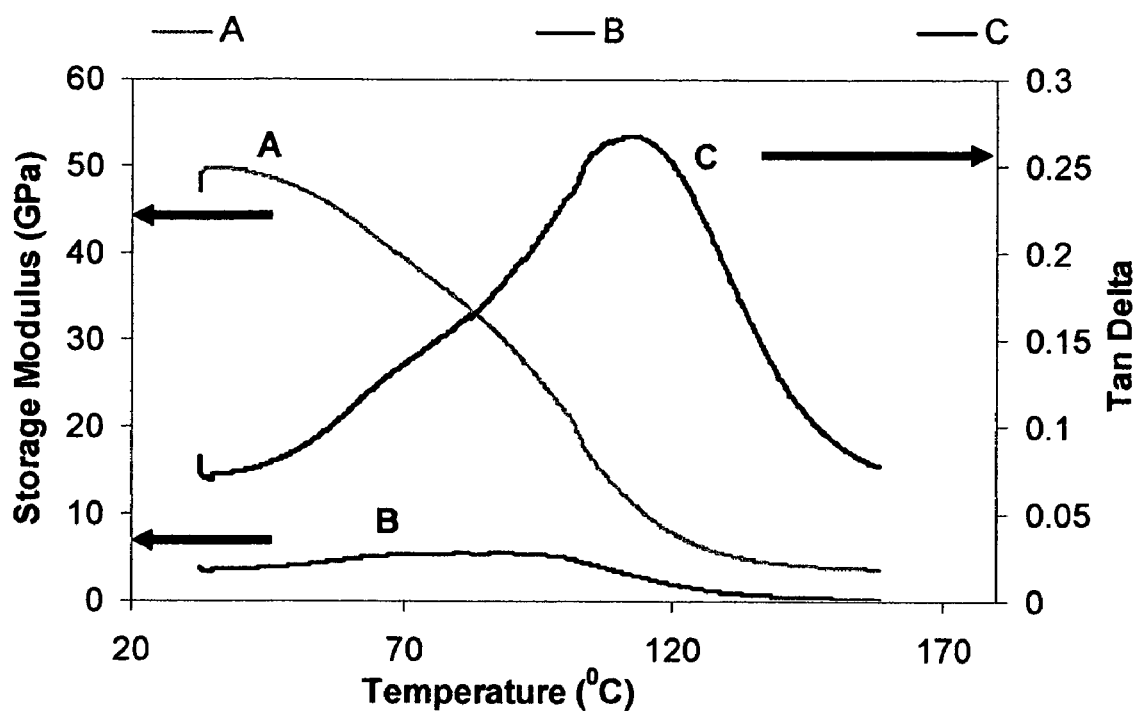
FIG. 14 is a graph showing a DMA plot for glass composites.

FIG. 14 shows a typical dynamical mechanical analysis plot for fiber composites. As is common in all thermoset systems, the storage modulus decreased with increasing temperature. The transition temperature of this composite was 110° C. As compared to storage modulus, loss modulus was very low over the entire range of test temperature.

The data for fiber composites confirmed that consistent materials had indeed been produced, meaning thereby, that the process parameters also had been optimized. Thus, the next step was development of SMC processed natural fiber composites.

Figure 15:
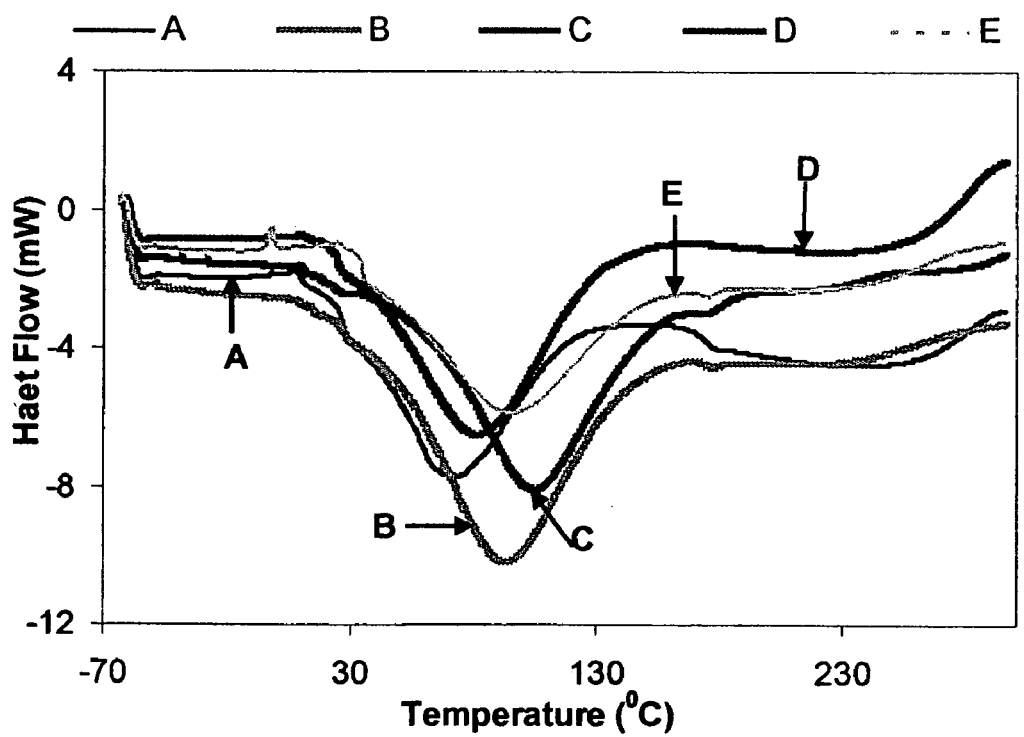
FIG. 15 is a graph of DSC plots of natural fibers used for SMC line.
Figure 16:
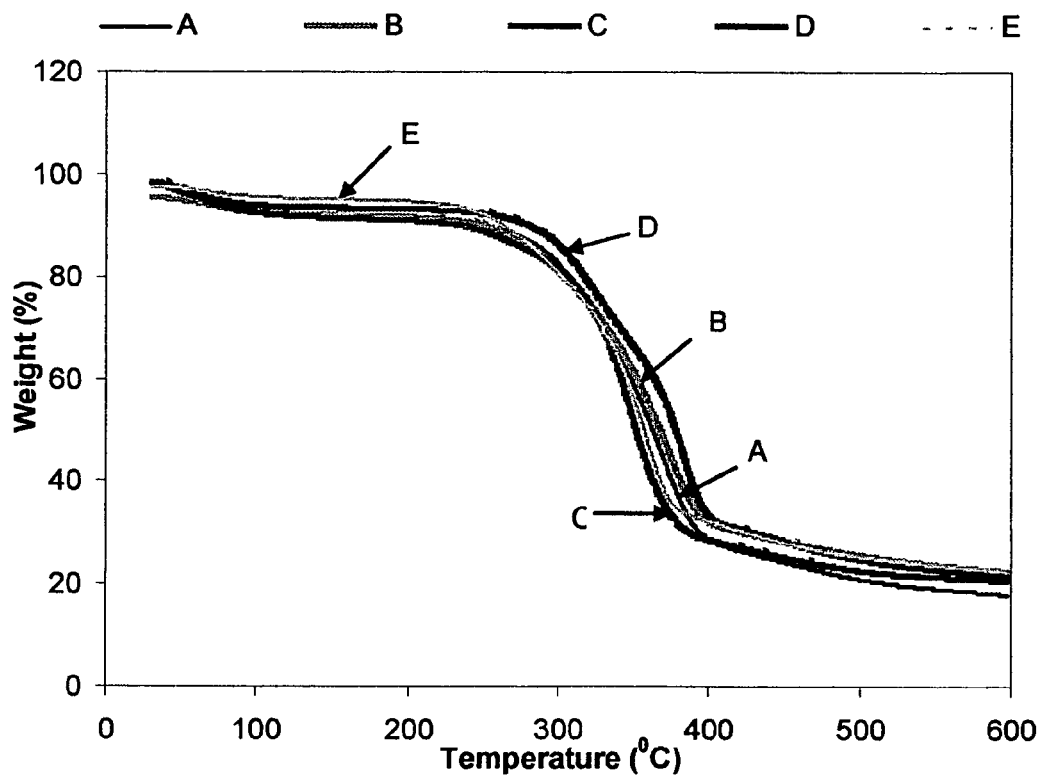
FIG. 16 is a graph of TGA plots of natural fibers used for SMC line.
Figure 18:
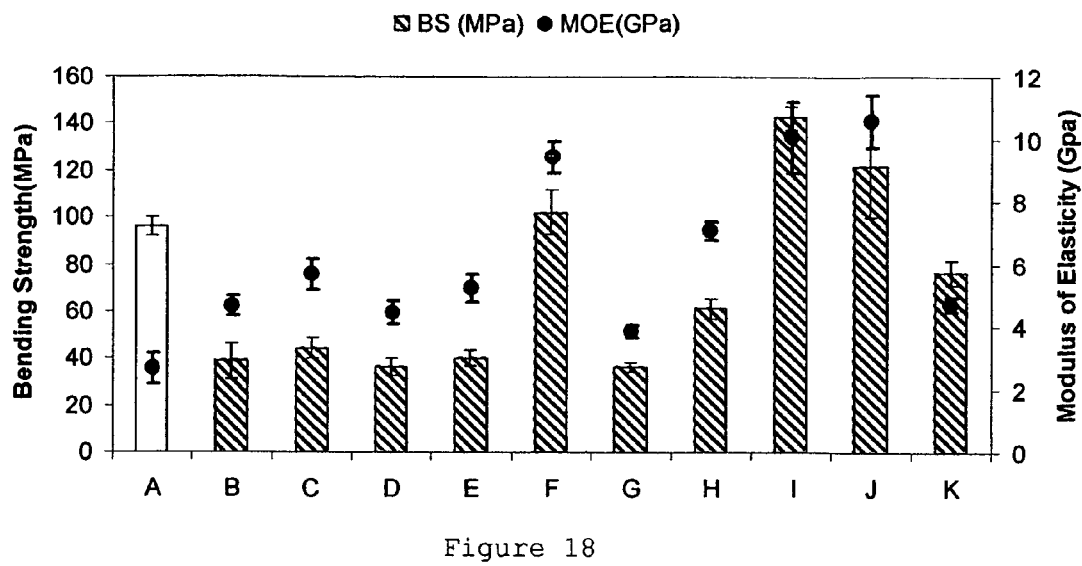
FIG. 18 is a graph showing flexural properties of biocomposites.

The thermal properties of natural fibers used for making biocomposites are shown in FIGS. 15 and 16 and Table 2. FIG. 18 shows the plots from DSC for five fiber samples. All the fibers showed the same transition from −60° C. to 300° C. A trough was observed in all of the five samples. This ranged from 74° C. for untreated BBSG, 94° C. for untreated green flax core, 106° C. for untreated hemp, 83° C. for silane treated BBSG, to 99° C. for silane treated green flax core. This was because of evaporation of water from natural fibers. This phenomenon is very common for natural fibers. From this data, it was interpreted that after silane treatment of fibers, the water evaporation occurs at a higher temperature as compared to that for untreated fibers.

FIG. 16 shows TGA plots for the same five fiber samples which were analyzed in DSC. Here too, all fibers showed the same kind of transition. The maximum degradation temperatures were found from the TGA plots and are listed in Table 2. The maximum degradation temperature for BBSG and green flax core increased after silane treatment. The percentage weight at 600° C. ranged from 18% for untreated BBSG to 22.5% for silane treated BBSG and silane treated green flax core. At higher temperatures, big blue stem grass was more stable than flax, as can be seen from the weight % curves.

TABLE 2

Maximum degradation temperatures for natural fibers

| Samples | Td, max (C) |
| --- | --- |
| A | 305.47 |
| B | 305.79 |
| C | 307.96 |
| D | 326.54 |
| E | 307.21 |

Legend: A=Untreated big blue stem grass, B=Untreated green flax core, C=Untreated hemp, D=Silane treated big blue stem grass, E=Silane treated green flax core.

Tables 3 and 4 show the results from XPS of natural fiber samples. These results also depict changes occurring in the fibers after surface treatment. According to Table 3, untreated BBSG and green flax core contain no silicon, while the presence of silicon was found in silane treated BBSG and green flax core. As compared to untreated BBSG and green flax core, silane treated BBSG and green flax core had a decreased concentration level of carbon, and an increased concentration of oxygen.

Table 4 shows the ratio of atomic concentrations of C/O, C/Si and C/N in all four samples. The C/O ratio decreased while moving from untreated BBSG to silane treated BBSG, and from untreated flax core to silane treated flax core. Between silane treated BBSG and silane treated flax core, C/Si ratio was higher for silane treated flax core.

TABLE 3

Atomic concentrations on the surfaces of fibers used for SMC line

|   | C1s[.314] | N1s[.499] | O1s[.733] | Si2p[.368] |
| --- | --- | --- | --- | --- |
| A | 85.77 | 2.55 | 11.68 | 0 |
| B | 84.55 | 1.46 | 13.99 | 0 |
| C | 84.26 | 1.24 | 12.3 | 2.2 |
| D | 81.66 | 1.51 | 15.57 | 1.25 |

Legend: A=Untreated big blue stem grass, B=Untreated green flax core, C=Silane treated big blue stem grass, D=Silane treated green flax core.

TABLE 4

Ratio of atomic concentrations of fibers

|   | C/Si | C/O | C/N |
| --- | --- | --- | --- |
| A |  | 7.34332 | 33.6353 |
| B |  | 6.0436 | 57.911 |
| C | 38.3 | 6.85041 | 67.9516 |
| D | 65.328 | 5.2447 | 54.0795 |

Legend: A=Untreated big blue stem grass, B=Untreated green flax core, C=Silane treated big blue stem grass, D=Silane treated green flax core.

Due to the large number of composites, the mechanical and thermal properties of these composites have been divided into two groups, and each group is individually discussed. The groups are: composites containing 20% calcium carbonate, and the composites containing no calcium carbonate at all. The properties of the group with $CaCO_3$ are first discussed.

Figure 17:
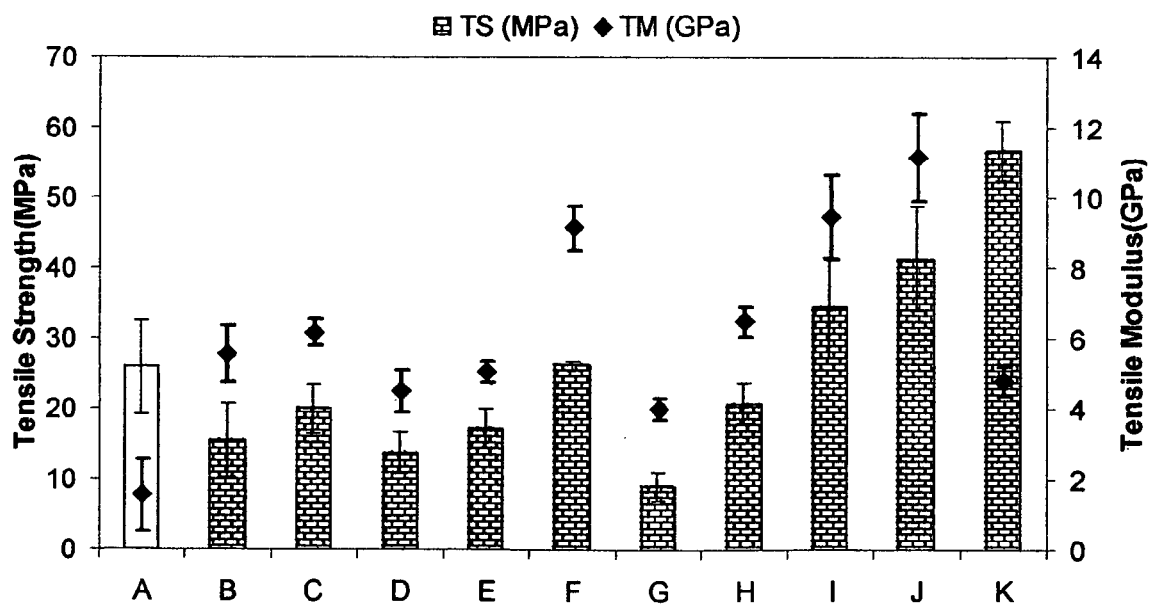
FIG. 17 is a graph showing tensile properties of biocomposites.

The tensile strengths and moduli of SMC produced biocomposites containing calcium carbonate, are shown in FIG. 17 where A to K are in Table 1. The bars (with bricks) represent tensile strength and the points (diamonds) denote tensile modulus.

The tensile strength of silane treated big blue stem biocomposite is 29% more than strength of untreated big blue stem (BBSG) bio-composite. While the tensile strength of silane treated big blue stem & green flax core bio-composite, is 25% more than strength of untreated big blue stem & green flax core bio-composite. And the tensile strength of treated big blue stem bio-composite is 12% more than strength of untreated big blue stem & flax bio-composite. The strength of untreated jute-hemp (25 wt %) hybrid bio-composite is 70% higher than that of untreated BBSG bio-composite. The strength of untreated green flax core bio-composite is 40% lower than that of untreated BBSG bio-composite. The strength of untreated jute-hemp (25 wt %) hybrid bio-composite is 20% higher than that of untreated jute-hemp (20 wt %) hybrid bio-composite. The strength of chopped E-glass composite is 20% higher than that of hybrid of E-glass mat-Hemp composite. The strength of chopped E-glass composite is 170% higher than that of untreated BBSG bio-composite. The strength of E-glass mat (30 wt %)—Bio-resin (20 wt %)—is 40% higher than that of chopped E-glass composite.

In case of tensile modulus, silane treated big blue stem bio-composite, has a modulus value 11.5% more than strength of untreated big blue stem bio-composite. The tensile modulus of silane treated big blue stem & green flax core bio-composite, is 12% more than that of untreated big blue stem & green flax core-UPE-CaCO3. And the tensile modulus of untreated treated big blue stem bio-composite is 22% more than modulus of untreated big blue stem & green flax core bio-composite. The tensile modulus of untreated jute-hemp (25 wt %) hybrid bio-composite is 65% higher than that of untreated BBSG bio-composite. The modulus of untreated green flax core bio-composite is 27% lower than that of untreated BBSG bio-composite. The modulus of untreated jute-hemp (25 wt %) hybrid bio-composite is 28% higher than that of untreated jute-hemp (20 wt %) hybrid bio-composite. The modulus of chopped E-glass composite is 18% higher than that of hybrid E-glass mat-Hemp composite. The modulus of chopped E-glass composite is 100% higher than that of untreated BBSG bio-composite. The modulus of E-glass mat (30 wt %)—Bio-resin (20 wt %)—is 60% lower than that of chopped E-glass composite.

The highest tensile strength was of the samples containing E-glass mat (30 wt %)—Bio-resin (20 wt %). The chopped E-glass composite and E-glass mat-hemp hybrid bio-composite had second and third highest tensile strengths, respectively. The highest tensile modulus was of the samples containing chopped E-glass. The E-glass mat-hemp hybrid bio-composite and untreated jute-hemp (25 wt %) bio-composite had second and third highest tensile moduli, respectively. The low values of tensile strengths and moduli of composites containing big blue stem grass and grass flax core were because of short length of these fibers.

The bending strengths and moduli of elasticity of SMC produced biocomposites containing calcium carbonate, are shown in FIG. 18. The bars represent bending strength and the points denote modulus of elasticity.

The bending strength of silane treated big blue stem-UPE-$CaCO_3$, is 15% more than strength of untreated big blue stem-UPE-$CaCO_3$. While, the bending strength of silane treated big blue stem & flax-UPE-$CaCO_3$, is 10% more than strength of untreated big blue stem & flax-UPE-$CaCO_3$.

And, the bending strength of untreated treated big blue stem-UPE-CaCO$_3$, is 6% more than strength of untreated big blue stem & flax-UPE-CaCO$_3$. The strength of untreated jute-hemp (25 wt %) hybrid bio-composite is 165% higher than that of untreated BBSG bio-composite. The strength of untreated green flax core bio-composite is 7% lower than that of untreated BBSG bio-composite. The strength of untreated jute-hemp (25 wt %) hybrid bio-composite is 40% higher than that of untreated jute-hemp (20 wt %) hybrid bio-composite. The strength of chopped E-glass composite is 14% lower than that of hybrid of E-glass mat-Hemp composite. The strength of chopped E-glass composite is 215% higher than that of untreated BBSG bio-composite. The strength of E-glass mat (30 wt %)—Bio-resin (20 wt %)—is 40% lower than that of chopped E-glass composite.

In case of modulus of elasticity, the silane treated big blue stem-UPE-CaCO$_3$, has a modulus value 21% more than the strength of untreated big blue stem-UPE-CaCO$_3$. The modulus of elasticity of silane treated big blue stem & flax-UPE-CaCO$_3$, is 17% more than that of untreated big blue stem & flax-UPE-CaCO$_3$. And the modulus of elasticity of treated big blue stem-UPE-CaCO$_3$, is 5% more than modulus of untreated big blue stem & flax-UPE-CaCO$_3$. The modulus of elasticity of untreated jute-hemp (25 wt %) hybrid bio-composite is 102% higher than that of untreated BBSG bio-composite. The modulus of elasticity of untreated green flax core bio-composite is 17% lower than that of untreated BBSG bio-composite. The modulus of elasticity of untreated jute-hemp (25 wt %) hybrid bio-composite is 25% higher than that of untreated jute-hemp (20 wt %) hybrid bio-composite. The modulus of elasticity of chopped E-glass composite is 5% higher than that of hybrid of E-glass mat-Hemp composite. The modulus of elasticity of chopped E-glass composite is 126% higher than that of untreated BBSG bio-composite. The modulus of elasticity of E-glass mat (30 wt %)—Bio-resin (20 wt %)—is 55% lower than that of chopped E-glass composite composite.

The highest bending strength was of the samples containing E-glass mat-hemp hybrid. The chopped E-glass composite and untreated jute-hemp (25 wt %) hybrid bio-composite had second and third highest bending strengths, respectively. The highest modulus of elasticity was of the samples containing chopped E-glass. The E-glass mat-hemp hybrid bio-composite and untreated jute-hemp (25 wt %) hybrid bio-composite had second and third highest moduli of elasticity, respectively. The bending strengths and moduli of elasticity followed the same trend as tensile strengths and moduli.

Figure 19:
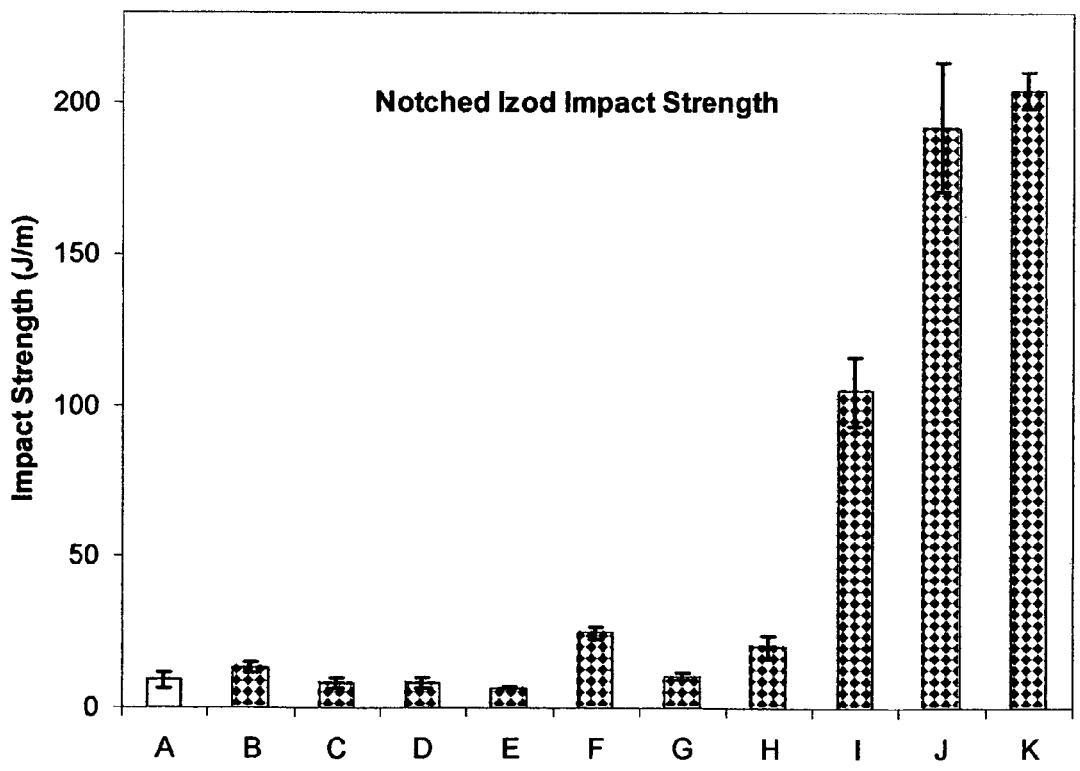
FIG. 19 is a graph showing the impact properties of biocomposites.

FIG. 19 shows the impact strength of composites of SMC produced biocomposites containing calcium carbonate. The impact strength of silane treated big blue stem-UPE-CaCO$_3$, is 65% less than strength of untreated big blue stem-UPE-CaCO$_3$. While, the impact strength of silane treated big blue stem & flax-UPE-CaCO$_3$, is 20% less than strength of untreated big blue stem & flax-UPE-CaCO3. The impact strength of treated big blue stem-UPE-CaCO$_3$, is 66% less than strength of untreated big blue stem & flax-UPE-CaCO$_3$. The strength of untreated jute-hemp (25 wt %) hybrid bio-composite is 86% higher than that of untreated BBSG bio-composite. The impact strength of untreated green flax core bio-composite is 20% lower than that of untreated BBSG bio-composite. The impact strength of untreated jute-hemp (25 wt %) hybrid bio-composite is 20% higher than that of untreated jute-hemp (20 wt %) hybrid bio-composite. The impact strength of chopped E-glass composite is 83% higher than that of hybrid of E-glass mat-Hemp composite. The impact strength of chopped E-glass composite is 1330% higher than that of untreated BBSG bio-composite. The impact strength of E-glass mat (30 wt %)—Bio-resin (20 wt %) is 7% higher than that of chopped E-glass composite.

The impact strengths of composites followed a pattern completely opposite to that of bending and tensile strengths. This is a common behavior for fiber reinforced plastics. The highest impact strength was of the samples containing of E-glass mat (30 wt %)—Bio-resin (20 wt %). The chopped E-glass composite, and E-glass mat-Hemp hybrid composite had second and third highest impact strength, respectively. The impact strengths of composites containing big blue stem grass and grass flax core were very small, because these fibers are very small in length. In particular, the length of BBSG fibers was about 4 mm, and that of green flax core was 1 mm.

Figure 20:
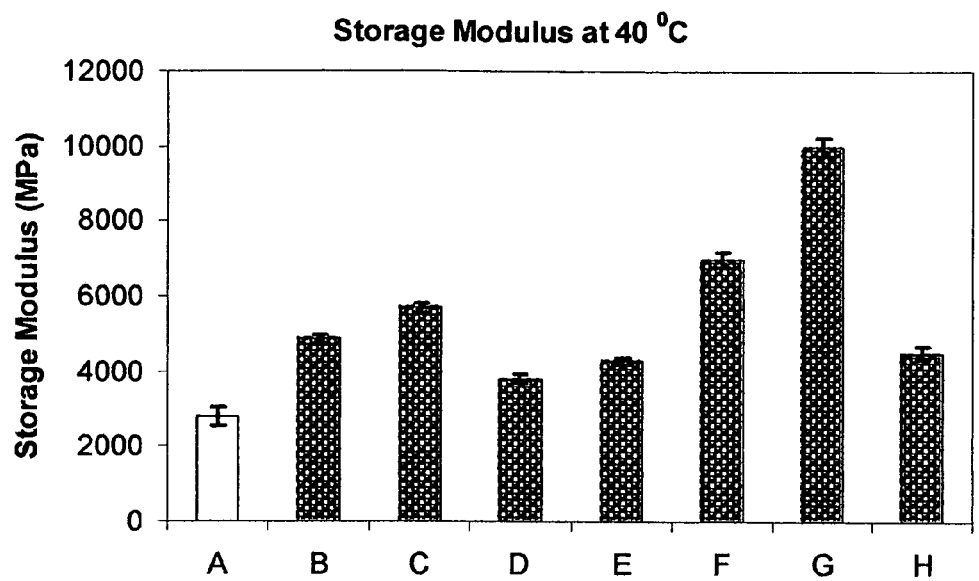
FIG. 20 is a graph showing storage modulus of biocomposites at 40 C.

The storage modulus of composites of the SMC produced biocomposites containing calcium carbonate are shown in FIG. 20. The storage modulus of silane treated big blue stem-UPE-CaCO$_3$, at 40° C., is 17.5% more than that of untreated big blue stem-UPE-CaCO$_3$. The modulus of silane treated big blue stem & flax-UPE-CaCO$_3$ is 13% more than modulus of untreated big blue stem & flax-UPE-CaCO$_3$. The modulus of treated big blue stem-UPE-CaCO$_3$ is 26% more than modulus of untreated big blue stem & flax-UPE-CaCO$_3$. The modulus of silane treated big blue stem-UPE-CaCO$_3$ is 32% more than modulus of silane treated big blue stem & flax-UPE-CaCO$_3$. The modulus of untreated jute-hemp (25 wt %) hybrid bio-composite is 45% higher than that of untreated BBSG bio-composite. The modulus of chopped E-glass composite is 105% higher than that of untreated BBSG bio-composite. The modulus of E-glass mat (30 wt %)—Bio-resin (20 wt %) is 55% lower than that of chopped E-glass composite.

The data for storage modulus followed the same trend as tensile modulus and modulus of elasticity.

Figure 21:
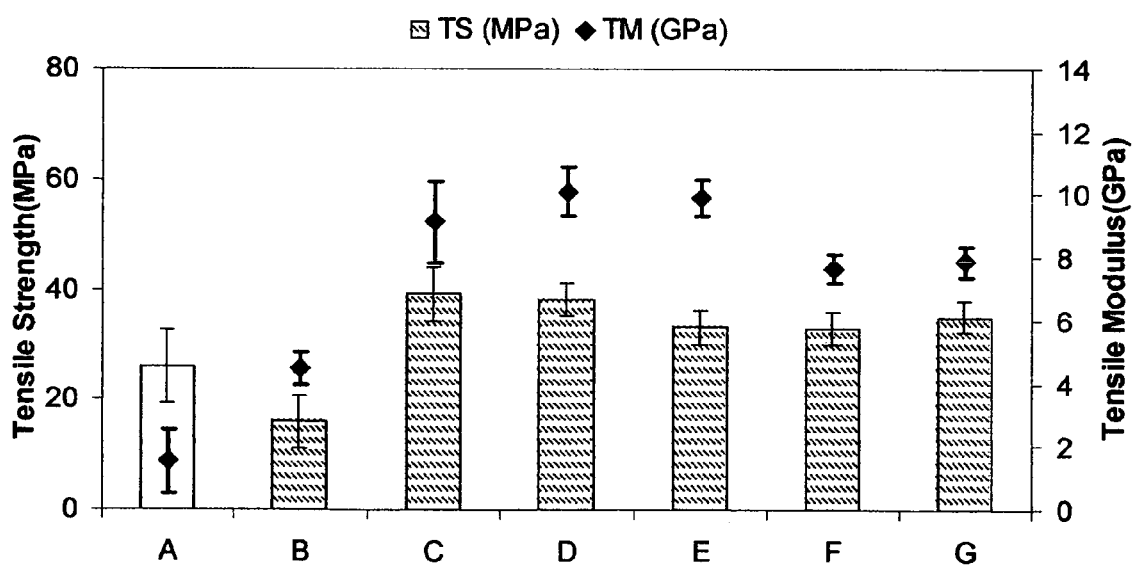
FIG. 21 is a graph showing tensile properties of biocomposites.

The tensile strengths and moduli of SMC produced bio-composites containing no calcium carbonate are shown in FIG. 21. The bars represent tensile strength and the points denote tensile modulus.

The tensile strength of the untreated hemp (25 vol %)—UPE bio-composite is 145% more than strength of untreated henequen (25 vol %)—UPE bio-composite. The tensile strength of untreated kenaf (25 vol %)—UPE bio-composite, is 138% more than strength of untreated henequen-UPE bio-composite. The tensile strength of untreated hemp-henequen-UPE bio-composite is 107% more than strength of untreated henequen (25 vol %)—UPE bio-composite. The strength of untreated kenaf-henequen-UPE hybrid bio-composite is 13% lower than that of untreated kenaf-UPE bio-composite. The strength of untreated hemp-henequen (30 wt %)—bio-resin (20 wt %) hybrid bio-composite is 10% lower than that of untreated hemp bio-composite. The strength of untreated henequen bio-composite is 38% lower than that of neat polyester resin. The strength of untreated hemp bio-composite is 51% higher than that of neat polyester resin. The strength of untreated kenaf bio-composite is 47% higher than that of neat polyester resin. The strength of untreated hemp-henequen hybrid bio-composite is 27% higher than that of neat polyester resin. The strength of untreated kenaf-henequen hybrid bio-composite is 27% higher than that of neat polyester resin. The strength of untreated hemp-henequen (30 wt %)—bioresin (20 wt %) hybrid bio-composite is 35% higher than that of neat polyester resin.

In case of the tensile modulus, the modulus of untreated hemp (25 vol %)—UPE bio-composite is 104% more than modulus of untreated henequen (25 vol %)—UPE biocomposite, while the tensile modulus of untreated kenaf (25 vol %)—UPE bio-composite, is 125% more than modulus of untreated henequen-UPE bio-composite. And, the tensile modulus of untreated hemp-henequen-UPE bio-composite is 120% more than modulus of untreated henequen (25 vol %)—UPE bio-composite. The modulus of untreated kenaf-henequen-UPE hybrid bio-composite is 24% lower than that of untreated kenaf-UPE bio-composite. The modulus of untreated hemp-henequen (30 wt %)—bio-resin (20 wt %) hybrid bio-composite is 14% lower than that of untreated hemp bio-composite. The modulus of untreated henequen bio-composite is 195% higher than that of neat polyester resin. The modulus of untreated hemp bio-composite is 500% higher than that of neat polyester resin. The modulus of untreated kenaf bio-composite is 560% higher than that of neat polyester resin. The strength of untreated hemp-henequen hybrid bio-composite is 550% higher than that of neat polyester resin. The modulus of untreated kenaf-henequen hybrid bio-composite is 402% higher than that of neat polyester resin. The modulus of untreated hemp-henequen (30 wt %)—bioresin (20 wt %) hybrid bio-composite is 415% higher than that of neat polyester resin.

The highest tensile strength were samples containing untreated hemp fibers. The untreated kenaf bio-composite and untreated hemp-henequen hybrid bio-composite had second and third highest tensile strengths, respectively. The highest tensile modulus was samples containing untreated kenaf fibers. The untreated hemp-henequen hybrid bio-composite and untreated hemp bio-composite had second and third highest tensile moduli, respectively. The low values of tensile strengths and moduli of composites containing big blue stem grass and grass flax core was because of short length of the fibers.

Figure 22:
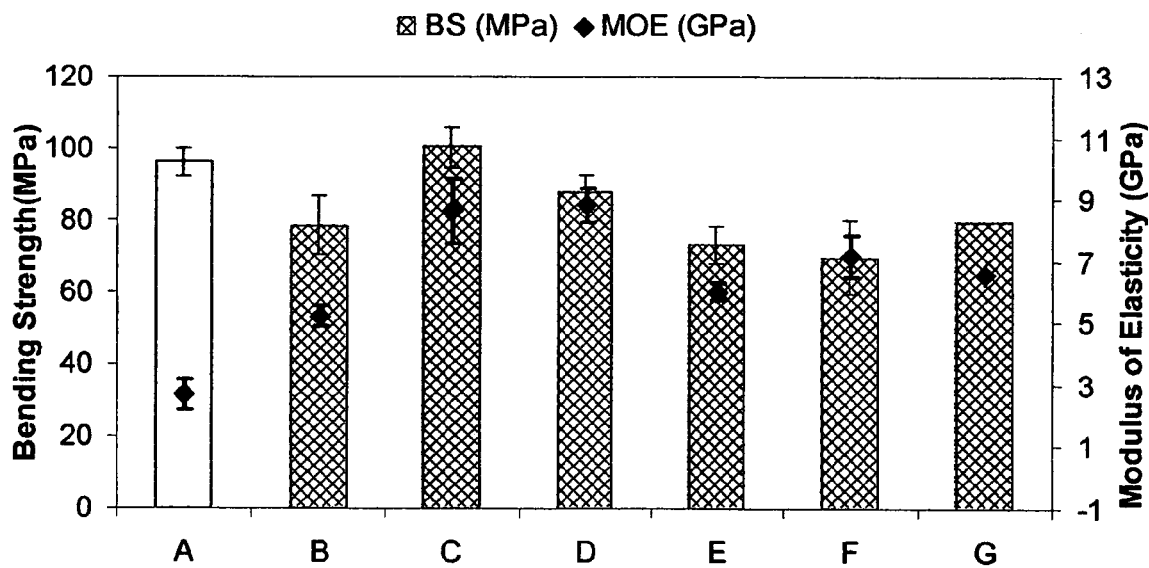
FIG. 22 is a graph showing flexural properties of biocomposites.

The bending strengths and moduli of elasticity of SMC produced biocomposites containing no calcium carbonate are shown in FIG. 22. The bars represent bending strength and the points denote modulus of elasticity.

The bending strength of the untreated hemp (25 vol %)—UPE bio-composite is 28% more than strength of untreated henequen (25 vol %)—UPE bio-composite, while the bending strength of untreated kenaf (25 vol %)—UPE bio-composite, is 12% more than strength of untreated henequen-UPE bio-composite. The bending strength of untreated hemp-henequen-UPE bio-composite is 7% less than strength of untreated henequen (25 vol %)—UPE bio-composite. The bending strength of untreated kenaf-henequen-UPE hybrid bio-composite is 11% lower than that of untreated kenaf-UPE bio-composite. The bending strength of untreated hemp-henequen (30 wt %)—bio-resin (20 wt %) hybrid bio-composite is 20% lower than that of untreated hemp bio-composite. The bending strength of untreated henequen bio-composite is 18% lower than that of neat polyester resin. The bending strength of untreated hemp bio-composite is 4% higher than that of neat polyester resin. The bending strength of untreated kenaf bio-composite is 8% lower than that of neat polyester resin. The bending strength of untreated hemp-henequen hybrid bio-composite is 23% lower than that of neat polyester resin. The bending strength of untreated kenaf-henequen hybrid bio-composite is 27% lower than that of neat polyester resin. The bending strength of untreated hemp-henequen (30 wt %)—bioresin (20 wt %) hybrid bio-composite is 17% lower than that of neat polyester resin.

In case of the modulus of elasticity, the modulus of untreated hemp (25 vol %)—UPE bio-composite is 66% more than modulus of untreated henequen (25 vol %)—UPE bio-composite. The modulus of elasticity of the untreated kenaf (25 vol %)—UPE bio-composite, is 70% more than modulus of untreated henequen-UPE bio-composite. And, the modulus of elasticity of untreated hemp-henequen-UPE bio-composite is 16% more than modulus of untreated henequen (25 vol %)—UPE bio-composite. The modulus of untreated kenaf-henequen-UPE hybrid bio-composite is 38% higher than that of untreated kenaf-UPE bio-composite. The modulus of untreated hemp-henequen (30 wt %)—bio-resin (20 wt %) hybrid bio-composite is 24% lower than that of untreated hemp bio-composite. The modulus of untreated henequen bio-composite is 94% higher than that of neat polyester resin. The modulus of untreated hemp bio-composite is 222% higher than that of neat polyester resin. The modulus of untreated kenaf bio-composite is 230% higher than that of neat polyester resin. The strength of untreated hemp-henequen hybrid bio-composite is 125% higher than that of neat polyester resin. The modulus of untreated kenaf-henequen hybrid bio-composite is 170% higher than that of neat polyester resin. The modulus of untreated hemp-henequen (30 wt %)—bioresin (20 wt %) hybrid bio-composite is 145% higher than that of neat polyester resin.

The highest bending strengths were samples containing untreated hemp fibers. The untreated kenaf bio-composite and untreated hemp-hennequen hybrid bio-composite had second and third highest bending strengths, respectively. The highest modulus of elasticity were samples containing untreated kenaf fibers. The untreated hemp bio-composite and untreated kenaf-henquen hybrid bio-composite had second and third highest moduli of elasticity, respectively. The bending strengths and moduli of elasticity followed the same trend as tensile strengths and moduli.

Figure 23:
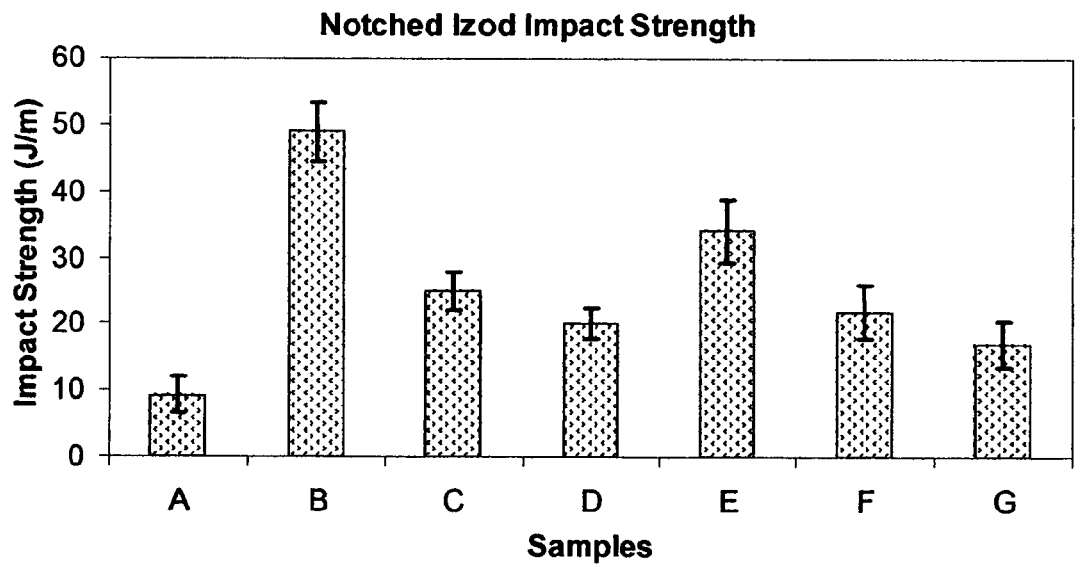
FIG. 23 is a graph showing impact properties of biocomposites.

FIG. 23 shows the impact strength of the SMC produced biocomposites containing no calcium carbonate. The impact strength of untreated hemp (25 vol %)—UPE bio-composite is 50% less than strength of untreated henequen (25 vol %)—UPE bio-composite. The impact strength of untreated kenaf (25 vol %)—UPE bio-composite, is 60% less than strength of untreated henequen-UPE bio-composite. The impact strength of untreated hemp-henequen-UPE bio-composite is 30% less than strength of untreated henequen (25 vol %)—UPE bio-composite. The impact strength of untreated kenaf-henequen-UPE hybrid bio-composite is 9% higher than that of untreated kenaf-UPE bio-composite. The impact strength of untreated hemp-henequen (30 wt %)—bio-resin (20 wt %) hybrid bio-composite is 16% lower than that of untreated hemp bio-composite. The impact strength of untreated henequen bio-composite is 430% higher than that of neat polyester resin. The impact strength of untreated hemp bio-composite is 170% higher than that of neat polyester resin. The impact strength of untreated kenaf bio-composite is 115% higher than that of neat polyester resin. The impact strength of untreated hemp-henequen hybrid bio-composite is 270% higher than that of neat polyester resin. The impact strength of untreated kenaf-henequen hybrid bio-composite is 135% higher than that of neat polyester resin. The impact strength of untreated hemp-henequen (30 wt %)—bioresin (20 wt %) hybrid bio-composite is 82% higher than that of neat polyester resin.

The impact strengths of composites followed a pattern completely opposite to that of bending and tensile strengths. This is a common behavior for fiber reinforced plastics. The highest impact strength was of the samples containing untreated henequen fibers. This result is not surprising, because it is known that leaf fibers have high toughness and low stiffness, while bast fibers have low toughness and high stiffness. A hybrid bio-composite of 25 wt % untreated hemp and 10 wt % untreated henequen had second highest impact strength.

Figure 24:
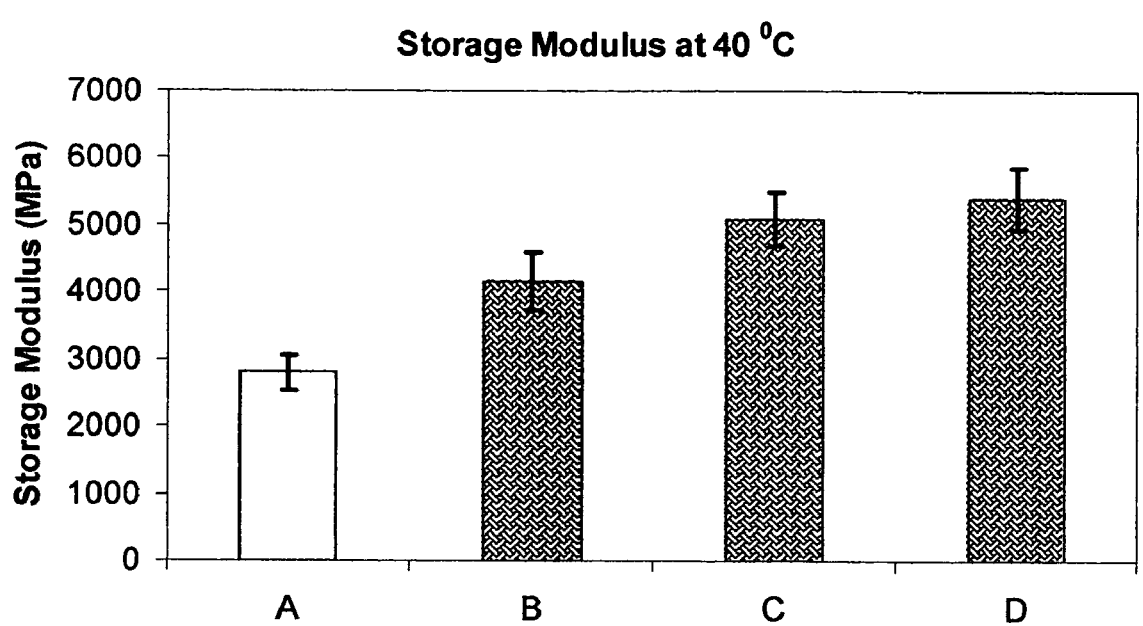
FIG. 24 is a graph showing storage modulus of biocomposites at 40 C.

The storage modulus of composites of SMC produced biocomposites containing no calcium carbonate, are shown in FIG. 24.

The storage modulus of the untreated hemp (25 vol %)—UPE bio-composite is 22% more than storage modulus of untreated henequen (25 vol %)—UPE bio-composite. The storage modulus of untreated kenaf (25 vol %)—UPE bio-composite is 30% more than storage modulus of untreated henequen-UPE bio-composite. The storage modulus of untreated henequen bio-composite is 50% more than that of neat polyester resin. The storage modulus of untreated hemp bio-composite is 83% higher than that of neat polyester resin. The storage modulus of untreated kenaf bio-composite is 93% higher than that of neat polyester resin.

The data for storage modulus followed the same trend as tensile modulus and modulus of elasticity.

Biocomposites have been successfully made using natural fibers, unsaturated polyester resin, and bioresin by sheet molding compound panel processing. These biocomposites were made in the same SMC equipment which is used to fabricate glass-polyester composites. As a comparison, we also fabricated glass-polyester composites on this equipment. The biocomposites were made on this SMC line after a few minor adjustments. Instead of using the traditional fiber feeding system, a screw feeder and a vibratory feeder to supply natural fibers to the set-up were used. Consistent and repeatable results were obtained showing that this process is consistent and can be used for fabrication of biocomposites.

It was also found that the glass-UPE composites have almost the same specific strength and modulus as natural fiber-UPE composites. With the optimization of the entire BCSMC process, the use of engineered natural fibers, and the inclusion of desirable additives, it was sought to achieve the best mechanical, thermal and physical properties comparable as to glass based SMC, and thus replace/substitute glass-UPE composites with natural fiber biocomposites.

THE PRESENT INVENTION THUS PROVIDES

1. A novel high volume processing technique named 'bio-composite stampable sheet, molding compound' (BC-SMC) manufacturing process was developed so as to mimic the continuous sheet molding compound (SMC) as is currently used in making glass fiber-polyester resin composites.

2. Natural fiber-unsaturated polyester resin biocomposites were fabricated using the bio-composite stampable sheet molding compound' (BCSMC) manufacturing process.

3. The natural fibers used for making the biocomposites using this process were: the big blue stem grass, green flax core, hemp, henequen, kenaf, coir, flax and jute.

4. For bio-composite fabrication using SMC line, 20% calcium carbonate by weight was added to the matrix as a filler 5. The natural fiber content was 20% by weight in biocomposites with big blue stem grass, silane treated big blue stem grass, silane treated big blue stem grass and green flax core, and, hemp and jute.

6. Unsaturated polyester resin content in the formulations mentioned in 5 was 60% by weight.

7. The highest fiber content for biocomposites, achievable using SMC process with UPE and CaCO3 in the matrix was 25% by weight, achieved in the case of a hybrid of untreated jute and hemp.

8. Hybrid biocomposites were made by combining, hemp with jute mats, hemp with kenaf, hemp with henequen, big blue stem grass with green flax core, silane treated big blue stem grass with silane treated green flax core, hemp with sisal.

9. A hybrid composite was made by combining E-glass mats with hemp.

10. To reduce the amount of UPE in the matrix, 20% by weight of bioresin was added to a hybrid bio-composite with hemp and henequen.

11. The bioresin mentioned in 10 was a soybean oil phosphate ester polyol modified with maliec anhydride.

12. The mechanical properties of hybrid biocomposites with BBSG and green flax core increased after chemical treatment with 1% methacryloxypropyltrimethoxy silane (γ—MPS).

13. For the SMC samples containing calcium carbonate, the highest tensile strength was of the samples containing E-glass mat (30 wt %)—Bio-resin (20 wt %).

14. For the SMC samples containing calcium carbonate, the chopped E-glass composite and E-glass mat-hemp hybrid bio-composite had second and third highest tensile strengths, respectively.

15. For the SMC samples containing calcium carbonate, the highest tensile modulus was of the samples containing chopped E-glass.

16. For the SMC samples containing calcium carbonate, the E-glass mat-hemp hybrid bio-composite and untreated jute-hemp (25 wt %) bio-composite had second and third highest tensile moduli, respectively.

17. For the SMC samples containing calcium carbonate, the highest bending strength was of the samples containing untreated hemp fibers.

18. For the SMC samples containing calcium carbonate, the untreated kenaf bio-composite and untreated hemp-hennequen hybrid bio-composite had second and third highest bending strengths, respectively.

19. For the SMC samples containing calcium carbonate, the highest modulus of elasticity was of the samples containing untreated kenaf fibers.

20. For the SMC samples containing calcium carbonate, the untreated hemp bio-composite and untreated kenaf-henquen hybrid bio-composite had second and third highest moduli of elasticity, respectively.

21. For the SMC samples containing calcium carbonate, the highest impact strength was of the samples containing of E-glass mat (30 wt %)—Bio-resin (20 wt %).

22. For the SMC samples containing calcium carbonate, the chopped E-glass composite, and E-glass mat-Hemp hybrid composite had second and third highest impact strength, respectively.

23. For the SMC samples containing no calcium carbonate, the highest tensile strength was of the samples containing untreated hemp fibers.

24. For the SMC samples containing no calcium carbonate, the untreated kenaf bio-composite and untreated hemp-henequen hybrid bio-composite had second and third highest tensile strengths, respectively.

25. For the SMC samples containing no calcium carbonate, the highest tensile modulus was of the samples containing untreated kenaf fibers.

26. For the SMC samples containing no calcium carbonate, the untreated hemp-henequen hybrid bio-composite and untreated hemp bio-composite had second and third highest tensile moduli, respectively.

27. For the SMC samples containing no calcium carbonate, the highest bending strength was of the samples containing untreated hemp fibers. For the SMC samples containing no calcium carbonate, the untreated kenaf bio-composite and untreated hemp-henequen hybrid bio-composite had second and third highest bending strengths, respectively.

28. For the SMC samples containing no calcium carbonate, the highest modulus of elasticity was of the samples containing untreated kenaf fibers.

29. For the SMC samples containing no calcium carbonate, the untreated hemp bio-composite and untreated kenaf-henequen hybrid bio-composite had second and third highest moduli of elasticity, respectively.

30. For the SMC samples containing no calcium carbonate, hybrid bio-composite of 25 wt % untreated hemp and 10 wt % untreated henequen had second highest impact strength.

31. For the SMC samples containing no calcium carbonate, untreated henequen bio-composite had the highest impact strength.

It is intended that the foregoing description be only illustrative of the present invention and that the present invention be limited only by the hereinafter appended claims.

We claim:
1. A prepreg which comprises:
(a) a first carrier sheet supporting a dried mat of naturally derived fibers with a moisture content of less than 10%;
(b) a matrix comprising a gelled polyester resin, which has been catalyzed to form cured polyester resin and applied to the mat as a liquid so as to be intermixed with the fibers; and
(c) a second carrier sheet over the matrix, wherein the first carrier sheet and the second carrier sheet have been compressed together with the matrix between the sheets to form the prepreg, wherein the prepreg is then stored at refrigeration temperatures prior to a heat and compression curing of the prepreg.

2. A sheet forming prepreg which comprises:
(a) a first carrier film;
(b) a dried mat of naturally derived fibers with a moisture content of less than 10%;
(c) a matrix comprising a gelled polyester resin, which has been catalyzed to form a cured polyester resin and applied as a liquid so as to be intermixed with the fibers; and
(d) a second carrier film with the mixture of the gelled polyester resin matrix and fibers between the first carrier film and the second carrier film, wherein the first and the second carrier film are compressed together to form the prepreg and wherein the prepreg is stored at refrigeration temperatures prior to a heat and compression curing of the prepreg.

3. The composition of claim 1 wherein the prepreg has a shelf life prior to the forming of the prepreg of at least one day.

4. The composition of claim 1 or 2 wherein the polyester resin has been gelled during the refrigeration.

5. The composition of claim 1 or 2 wherein the fibers have been chemically modified to enable reaction with the polyester resin.

6. The composition of claim 1 or 2 wherein the fibers have been treated with a compatibilizer which enables intermixing of the fibers with the polyester resin at least during curing of the prepreg.

7. The prepreg of claim 1 or 2 wherein the fibers are chopped.

8. The prepreg of claim 1 wherein the fibers are as a woven or non-woven as a mat.

9. The prepreg of claim 1 wherein the fibers are chopped and have a length ranging between 1 mm and 50 mm.

10. The prepreg of claim 1 wherein the fibers are either randomly oriented or preferentially aligned in one direction.

11. The prepreg of claim 1 wherein the natural fibers are combined with other fibers either within the mat, or with other mats of a different fiber composition.

12. A process for forming a prepreg which comprises:
(a) providing a first carrier sheet;
(b) intermixing a matrix comprising a polyester resin, which has been catalyzed to form a gelled polyester resin, and applied as a liquid in a dried mat of naturally derived fibers with a moisture content of less than 10% on the first carrier sheet;
(c) applying a second carrier sheet to the matrix;
(d) compressing the first carrier sheet and the second carrier sheet together; and
(e) storing the prepreg at refrigeration temperatures prior to curing of the prepreg.

13. In a process for forming a cured sheet the improvement which comprises forming a prepreg which comprises:
(a) providing a first carrier film;
(b) providing a dried mat of naturally derived fibers with a moisture content of less than 10%;
(c) intermixing a matrix comprising a liquid polyester resin which has been catalyzed to form a gelled and then cured polyester resin with the fibers on the first carrier film;
(d) providing a second carrier film with the mixture of the matrix and fibers between the first and second fibers;
(e) compressing the first carrier film and the second carrier film together to form the prepreg; and
(f) storing the prepreg at refrigeration temperatures prior to heat and compression curing of the prepreg.

14. The process of claim 12 or 13 wherein the prepreg has a shelf life prior to the curing of the prepreg of at least one day.

15. The process of claim 12 or 13 wherein the polyester resin is gelled during the refrigeration.

16. The process of claim 12 or 13 wherein the fibers have been chemically modified to enable reaction with the polyester resin.

17. The process of claim 12 or 13 wherein the fibers have been treated with a compatibilizer which enables intermixing with the polyester resin at least during curing of the prepreg.

18. The process of claim 12 or 13 wherein surfaces of the fiber have been chemically modified to react with the polyester resin at least during curing.

19. The process of claim 12 or 13 wherein the fibers are chopped.

20. The process of claim 12 or 13 wherein the fibers are chopped and have a length ranging between 1 mm and 50 mm.

21. The process of claim 12 or 13 wherein the fibers are either randomly oriented or preferentially aligned in one direction.

22. The prepreg of claim 12 or 13 wherein the natural fibers are combined with other fibers either within the mat, or with other mats of different fiber composition.

23. The process of claim 12 or 13 wherein the fibers have been woven or are nonwoven as the mat.

24. A heat and pressure cured formed object derived from prepreg as in claim 1 or 2.

25. The process of claim 12 or 13 wherein the prepreg is in addition formed and cured into a formed object.

26. An apparatus for describing chopped fibers continuously as a mat on a conveyor surface which comprises:
(a) a hopper with a screw feeder for delivering the chopped fibers to an outlet;
(b) an inclined fiber distribution feed chute at the outlet of the hopper with a series of rods on the chute which laterally disperse a portion of the fibers along with a shaking means mounted on the chute which vibrates the chute to move the fibers down the incline and off the incline; and
(c) a vibratory feeder with a tray below the chute for receiving the fibers from the chute, wherein the fibers are deposited as a mat on the tray and are dispersed from the tray by a slot in the tray allowing the mat as it advances on the tray of the feeder to be deposited onto the conveyor surface.

27. The apparatus of claim 26 wherein the shaking means for the chute is provided by the vibratory feeder.

28. The apparatus of claim 26 wherein an independent shaking means is mounted on the chute.

29. The apparatus of any one of claims 26, 27 or 28 which in addition includes the conveyor and a production line for forming a sheet molding compound.

30. The prepreg of claim 1 or 2 wherein in addition the gelled resin contains a calcium carbonate filler.

31. The process of claim 12 or 13 wherein in addition the liquid polyester resin comprises calcium carbonate as a filler.

32. The prepreg of claim 1 or 2 wherein the liquid polyester resin has been applied to both the first carrier sheet and the second carrier sheet in claim 1 or the first carrier film and the second carrier film in claim 2 before being intermixed with the mat of fibers.

33. The process of claim 12 or 13 wherein in addition the liquid polyester resin is applied to both the first carrier sheet and the second carrier sheet in claim 12 or the first carrier film and the second carrier film in claim 13 before being intermixed with the polymer.

* * * * *